United States Patent
Kitagawa et al.

(10) Patent No.: US 6,603,980 B1
(45) Date of Patent: Aug. 5, 2003

(54) TRANSMITTER-RECEIVER, AND METHOD FOR CONTROLLING TRANSMISSION POWER OF THE SAME

(75) Inventors: Keiichi Kitagawa, Yokosuka (JP); Mitsuru Uesugi, Yokosuka (JP); Kazuyuki Miya, Kawasaki (JP); Makis Kasapidis, Thatcham (GB)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 09/529,871

(22) PCT Filed: Aug. 27, 1999

(86) PCT No.: PCT/JP99/04628

§ 371 (c)(1),
(2), (4) Date: Apr. 20, 2000

(87) PCT Pub. No.: WO00/13325

PCT Pub. Date: Mar. 9, 2000

(30) Foreign Application Priority Data

Aug. 28, 1998 (JP) .............................. 10-243743
Mar. 11, 1999 (JP) .............................. 11-065684
Jun. 24, 1999 (JP) .............................. 11-178926

(51) Int. Cl.⁷ .............................................. H04B 7/00
(52) U.S. Cl. .................. 455/522; 455/127; 370/318; 370/310; 375/140; 375/141; 375/142; 375/143
(58) Field of Search ..................... 370/318; 455/522, 455/127; 375/140, 141, 142, 143

(56) References Cited

U.S. PATENT DOCUMENTS

| | | | | |
|---|---|---|---|---|
| 5,933,781 A | * | 8/1999 | Willenegger et al. | 370/342 |
| 6,137,841 A | * | 10/2000 | Velez et al. | 375/298 |
| 6,304,562 B1 | * | 10/2001 | Kim et al. | 370/332 |
| 6,311,070 B1 | * | 10/2001 | Tong et al. | 370/318 |
| 6,347,083 B1 | * | 2/2002 | Nishino | 370/342 |
| 6,396,867 B1 | * | 5/2002 | Tiedemann et al. | 370/342 |
| 6,411,799 B1 | * | 6/2002 | Padovani | 455/522 |

FOREIGN PATENT DOCUMENTS

| | | |
|---|---|---|
| JP | 5102943 | 4/1993 |
| JP | 6-13956 | 1/1994 |
| JP | 10-22978 | 1/1998 |
| JP | 10108249 | 4/1998 |

* cited by examiner

Primary Examiner—William Trost
Assistant Examiner—Stephen D'Agosta

(57) ABSTRACT

Received quality detecting section 108 detects a received quality, bit determining section 111 determines whether a TPC bit is 0 or 1, amplitude reading section 112 reads a ratio of an amplitude of a signal other than the TPC bit and an amplitude of the TPC bit, accumulating section 113 determines an increase or decrease of transmit power and an amount of the increase and decrease of the transmit power using a symbol of the TPC bit for the increase or decrease, and an amplitude ratio for the amount of the increase and decrease to instruct to transmission amplifier 104, and multiplying section 114 multiplies the amplitude of the signal other than the TPC bit by a correction value corresponding to the received quality to determine the amplitude of the TPC bit.

48 Claims, 20 Drawing Sheets

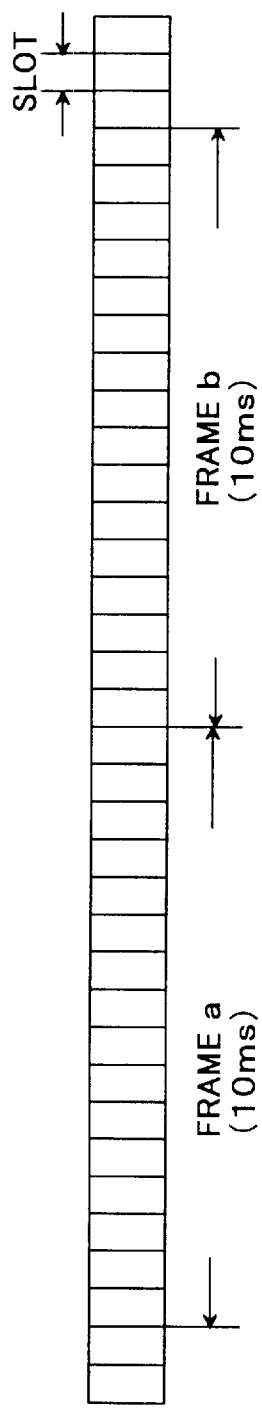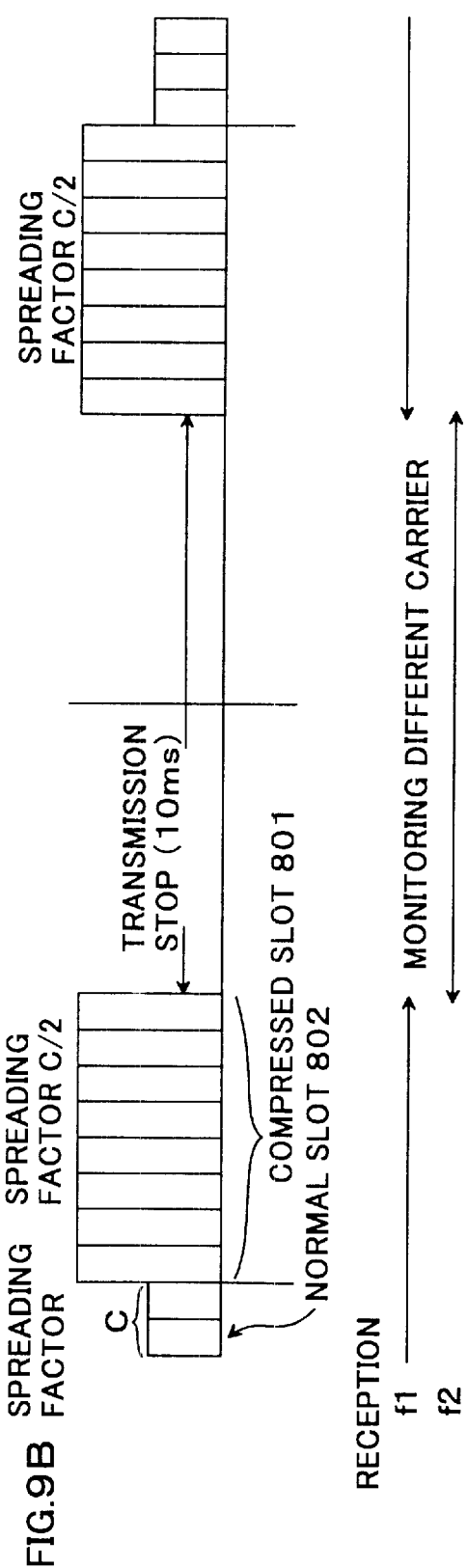

COMPRESSED SLOT 801

C CHIP

NORMAL SLOT 802

C/2 CHIP     SYMBOL

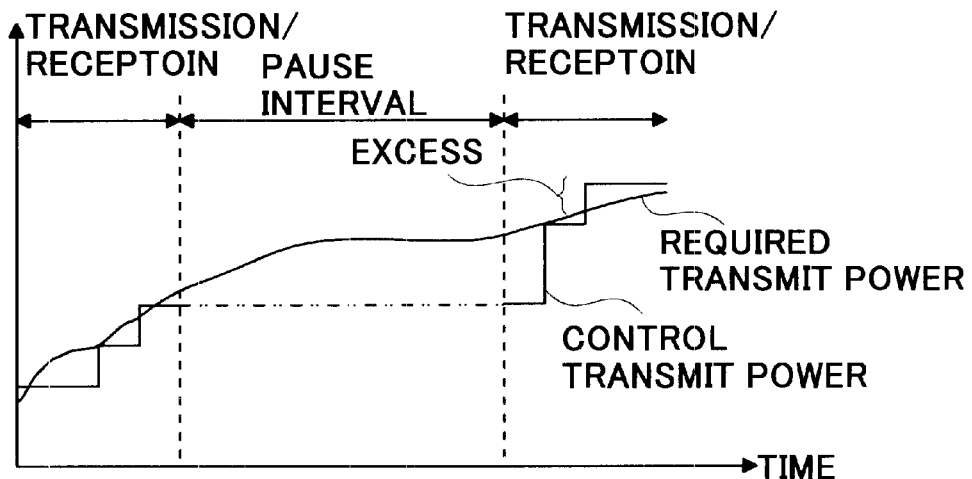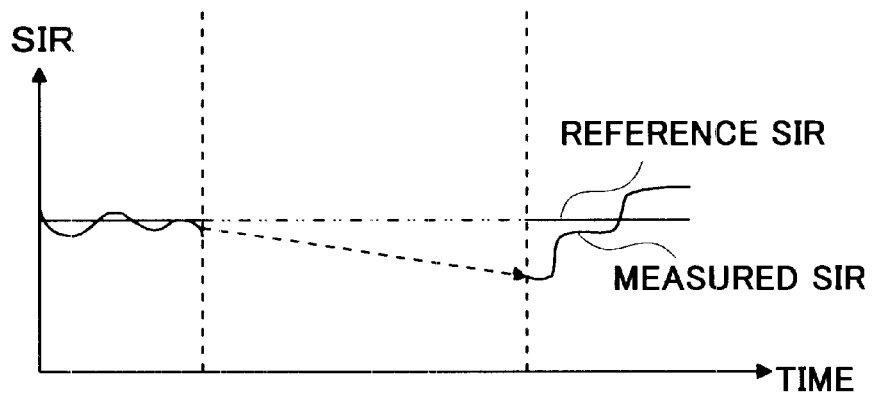
FIG.16

TRANSMITTER-RECEIVER, AND METHOD FOR CONTROLLING TRANSMISSION POWER OF THE SAME

TECHNICAL FIELD

The present invention relates to a transmission/reception apparatus and its transmit power control method of a mobile communication using a CDMA system.

BACKGROUND ART

A transmission/reception apparatus and its transmit power control method in a conventional mobile communication are explained using FIG. 20. FIG. 1 is a main block diagram showing an outlined configuration of a conventional transmission/reception apparatus.

Frame assembling section 1 multiplexes transmission data with a TPC bit. Spreading section 2 spreads/modulates the multiplexed data and BPF 3 eliminates an unnecessary signal from the spread/modulated signal. Transmission amplifier 4 amplifies the transmission signal stripped of the unnecessary signal. Duplexer 5 controls an input/output signal to/from antenna 6. Antenna 6 radiates the amplified transmission signal.

Antenna 6 receives a transmitted signal. Despreading section 7 demodulates the reception signal. At this time, received quality detecting section 8 detects a received quality by calculating a signal interference ratio (hereinafter referred to as "SIR") from the result of despreading performed by despreading section 7.

TPC bit generating section 9 receives the detection result of received quality detecting section 8 and generates a TPC bit to instruct a far-end station to increase transmit power if the received quality falls 10 below a desired quality and lower transmit power if the received quality equals to or exceeds the desired quality to reduce interference with other users. For example, the TPC bit is set to 1 if the received quality falls below the desired quality and 0 if the received quality equals to or exceeds the desired quality. The TPC bit generated is sent to frame assembling section 1 and multiplexed with transmission data.

Determining section 10 acquires reception data from the demodulated reception signal and at the same time extracts the TPC bit generated and sent by the far-end station and determines whether the TPC bit is 0 or 1. Accumulating section 11 receives the judgment result of determining section 10 and instructs transmission amplifier 4 to increase or decrease transmit power according to the result. It is predetermined that, for example, if the determination result is 0, accumulating section 11 determines that the instruction from the far-end station is to decrease transmit power and decreases the current amount of amplification by 1 dB and if the determination result is 1, accumulating section 11 determines that the instruction from the far-end station is to increase transmit power and increases the current amount of amplification by 1 dB.

In this way, the conventional transmission/reception apparatus and transmit power control method maintain appropriate transmit power by the transmission/reception apparatuses of both the base station and mobile station carrying out transmit power control based on the TPC bit in the reception signal.

However, in the conventional transmission/reception apparatus and transmit power control method, since an amount of the increase or decrease during transmit power control, that is, a range of transmit power to be increased or decreased based on a TPC bit made up of one received bit is a predetermined fixed value (±1 dB in the example above), if this fixed value is too large, it is difficult to control transmit power appropriately and maintain stability when amplitude variations are small (during slow fading), whereas if this fixed value is too small, poor traceability results when there are considerable amplitude variations (during fast fading).

A situation with large amplitude variations occurs, for example, when a compressed mode is used. A system which provides a pause interval such as compressed mode produces a large difference between a control transmit power value and required transmit power value which is a target value.

Moreover, the example above has a TPC bit made up of one bit, and therefore can only transmit or receive two values, that is, "increase or" decrease. Therefore, it is also possible to increase an amount of information that can be transmitted/received by increasing assignment to the TPC bit within one slot and finely control not only an increase or decrease of transmit power but also the amount of the increase or decrease. However, since the number of bits within one slot is fixed, increasing the number of bits used as TPC bits will cause a problem of reducing data transmission efficiency.

Moreover, in the above example, control is limited to increasing or decreasing transmit power even if transmit power is appropriate and it is preferable to maintain the current value, and thus it is not possible to maintain a fixed value, ending up repeating increases and decreases in short cycles centered on an appropriate value.

DISCLOSURE OF INVENTION

It is an objective of the present invention to provide a transmission/reception apparatus and its transmit power control method combining trackability during fast fading or when a compressed mode is applied and stability during slow fading without reducing data transmission efficiency.

The transmission/reception apparatus and its transmit power control method in the present invention allows the amplitude of a TPC bit to be set apart from other transmission signals. Especially, using not only the symbol of a TPC bit but also the amplitude as parameters allows the symbol to represent an increase or decrease and the amplitude to represent an amount of the increase or decrease, making it possible for one TPC bit to transmit not only control of a certain amount of increase or decrease of transmit power but also control by increasing or decreasing transmit power by an arbitrary amount of increase or decrease.

BRIEF DESCRIPTION OF DRAWINGS

FIG. 9A and FIG. 9B are transmission timing charts to explain a compressed mode;

FIG. 16 are graphs showing variations of control transmit power and SIR to explain transmit power control according to Embodiment 5 of the present invention;

BEST MODE FOR CARRYING OUT THE INVENTION

With reference now to the attached drawings, the embodiments of the present invention are explained in detail below.

EMBODIMENT 1

Figure 1:
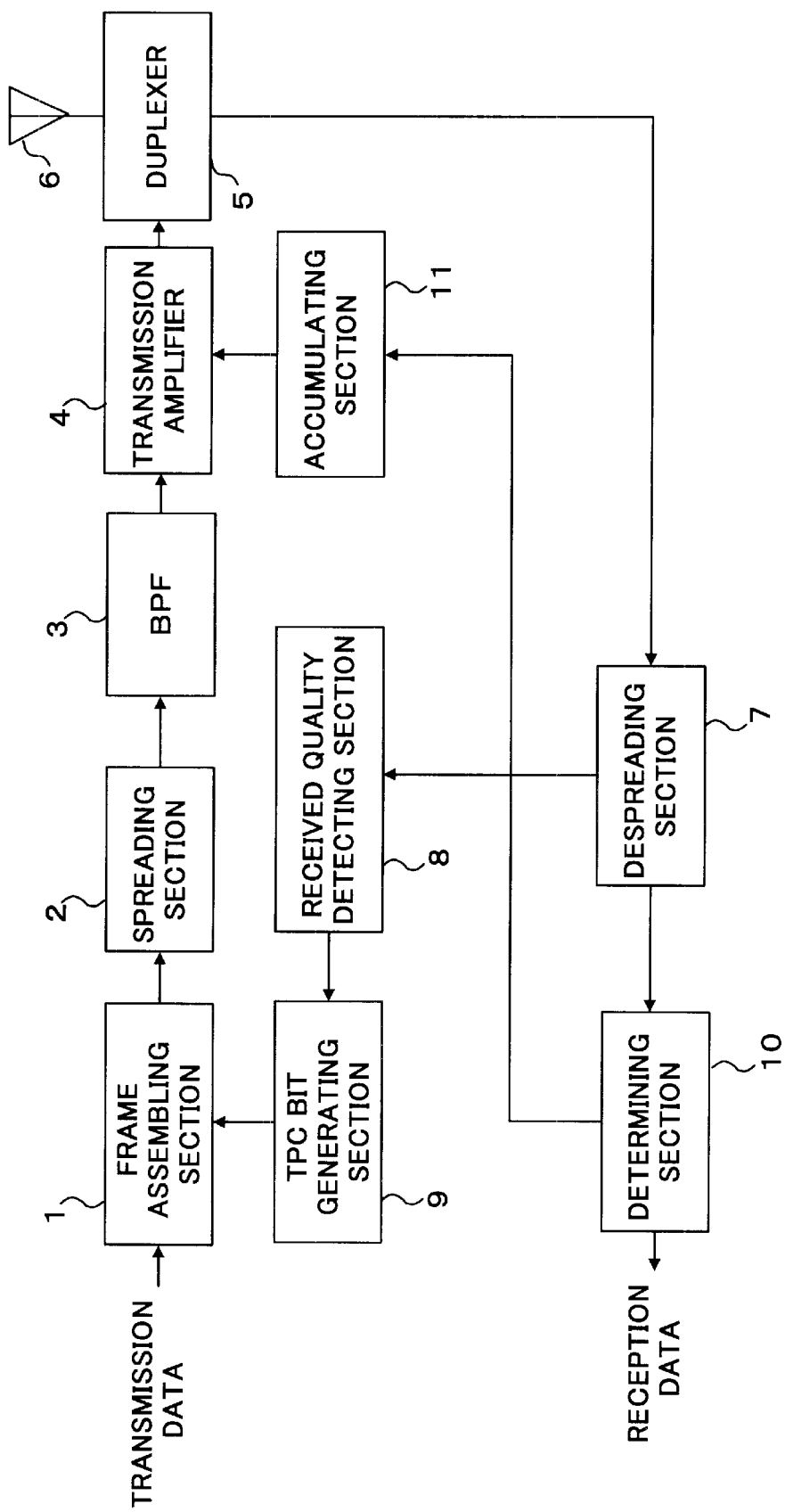
FIG. 1 is a block diagram showing an outlined configuration of a conventional transmission/reception apparatus.
Figure 2:
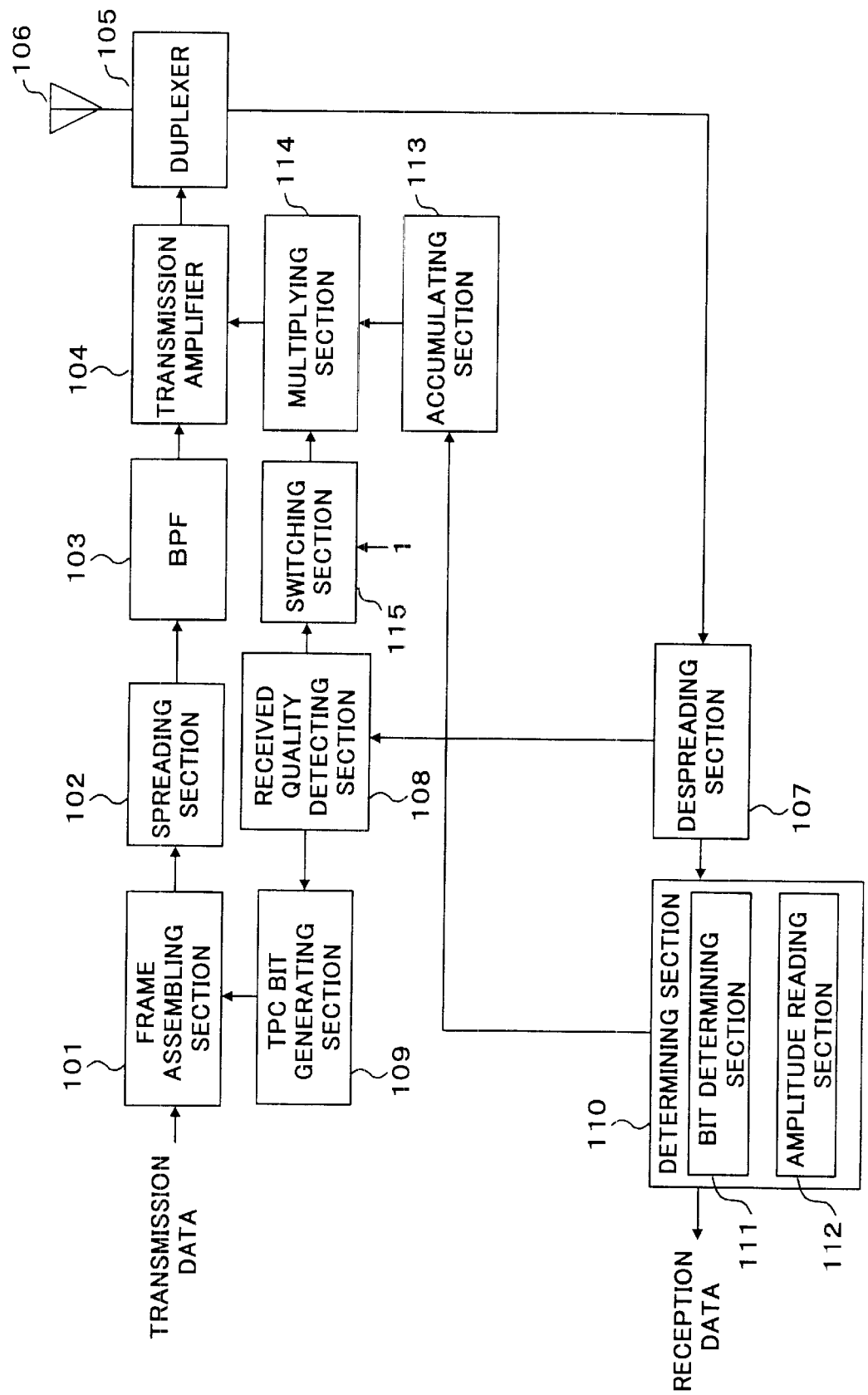
FIG. 2 is a main block diagram showing an outlined configuration of a transmission/reception apparatus according to Embodiment 1 of the present invention.
Figure 3:
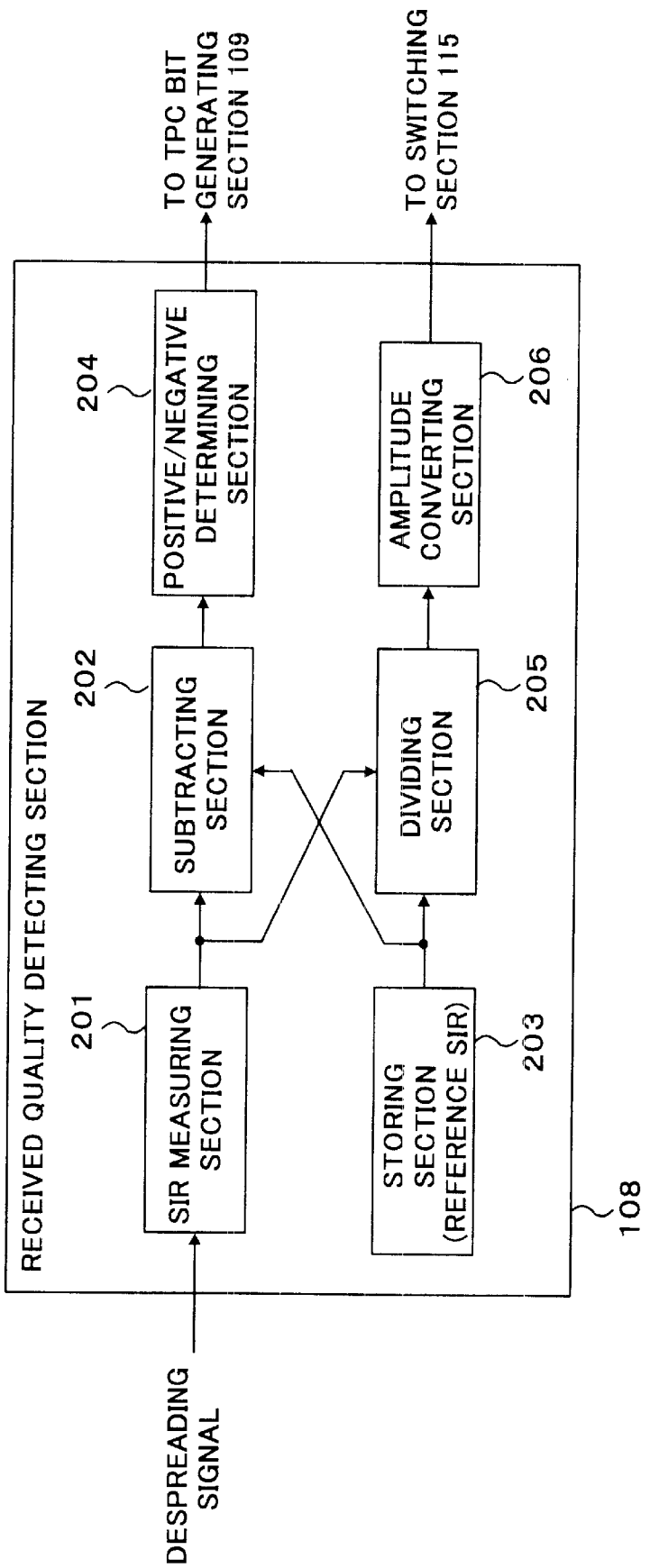
FIG. 3 is a main block diagram showing an outlined configuration of a received quality detecting section according to Embodiment 1 of the present invention.

First, the transmission/reception apparatus according to Embodiment 1 of the present invention is explained using FIG. 2 and its transmit power control method is explained using FIG. 2 and FIG. 3. FIG. 2 is a block diagram showing an outlined configuration of the transmission/reception apparatus according to Embodiment 1 of the present invention.

Frame assembling section 101 multiplexes transmission data with a TPC bit. Spreading section 102 spreads/modulates the multiplexed data. BPF 103 eliminates an unnecessary signal. Transmission amplifier 104 amplifies the transmission signal. This transmission signal is radiated from antenna 106 via duplexer 105.

Antenna 106 receives a transmitted signal. Despreading section 107 demodulates the reception signal. At this time, received quality detecting section 108 detects a received quality from an SIR of despreading section 107. The configuration of received quality detecting section 108 will be described later. TPC bit generating section 109 generates a TPC bit based on this received quality and sends it to frame assembling section 101.

Determining section 110 includes bit determining section 111 and amplitude reading section 112. Determining section 110 acquires reception data from the demodulated reception signal and outputs it. Bit determining section 111 extracts a TPC bit from the reception signal and determines whether the TPC bit is 0 or 1. On the other hand, amplitude reading section 112 reads a ratio of the amplitude of the signal other than the TPC bit to the amplitude of the TPC bit in the reception signal.

Accumulating section 113 obtains the symbol and amplitude ratio of the TPC bit of the reception signal from determining section 110. The symbol indicates an instruction for an increase or instruction for a decrease of transmit power and the amplitude ratio indicates an amount of the increase or decrease of transmit power. Accumulating section 113 can obtain an amplitude control value to instruct transmission amplifier 104 to increase or decrease transmit power by an arbitrary amount of increase or decrease by combining these two conditions.

Thus, by making the amplitude of the TPC bit variable and using not only the symbol but also the amplitude as parameters, it is possible to perform not only control of a certain amount of increase or decrease of transmit power but also fine control increasing or decreasing transmit power by an arbitrary amount of increase or decrease. Therefore, it is possible to respond not only to fast fading with large amplitude variations but also to slow fading with small amplitude variations.

Moreover, if the amplitude of the received TPC bit is 0, the amplitude control value, which is the output of accumulating section 113, is ±0 and the increase or decrease instruction indicated by the TPC bit symbol is substantially insignificant and an instruction "retain the current value" is sent to transmission amplifier 104.

Multiplying section 114 has a function to instruct transmission amplifier 104 to transmit the TPC bit in the transmission signal with a variable amplitude based on the received quality, not the same amplitude as that of other bits based on the amplitude control value calculated by accumulating section 113. That is, it is possible to include the received quality by multiplying the amplitude control value by a correction value calculated from the received quality detected by received quality detecting section 108 only during transmit power control of the TPC bit.

This allows a transmission signal other than the TPC bit to be sent with an amplitude as instructed by the far-end station and allows the TPC bit to change the amplitude as instructed by the far-end station based on a ratio as to how far the received quality is from a reference and indicate the ratio of the distance from the reference by the change.

This correction value is proportional to a difference between the received quality and desired quality. That is, the farther the received quality is from the received quality, the larger the correction value becomes, and the smaller the distance, the closer to 1 the correction value comes. Thus, it is possible to provide an amplitude proportional to the requested amount of increase or decrease of transmit power control to the far-end station for the TPC bit in the transmission signal. The method of calculating the correction value will be described later.

Switching section 115 has a function to switch between pre-stored value "1" and a value indicating the received quality from received quality detecting section 108 and send either one to multiplying section 114. This function of switching section 115 makes it possible to always maintain the correction value to 1 when controlling transmit power of bits other than the TPC bit and send the correction value from received quality detecting section 108 to multiplying section 114 only when controlling transmit power of the TPC bit.

In this way, it is possible to make variable the amplitude of only the TPC bit in one slot of a transmission signal with a fixed amplitude and allow the determining section of the far-end station to read the symbol and amplitude. When the amplitude of the TPC bit is small, more errors can occur, but this means that the amount of transmit power control is small, and therefore the influence can be small.

Then, the configuration of received quality detecting section 108 is described in detail using FIG. 3. FIG.3 is a main block diagram showing an outlined configuration of the received quality detecting section according to Embodiment 1.

For a despread signal entered in received quality detecting section 108, an SIR is measured by SIR measuring section 201 first. Subtracting section 202 subtracts a reference SIR retained by storing section 203 from the SIR of the measured reception signal (hereinafter referred to as "measured SIR") and sends the result to positive/negative determining section 204. Positive/negative determining section 204 determines whether the subtraction result is positive or negative and sends the result to TPC bit generating section 109. This allows TPC bit generating section 109 to determine 0 or 1, that is, whether to instruct to increase or decrease transmit power and generate the bit.

Dividing section 205 calculates the ratio of the measured SIR to the reference SIR and sends the result to amplitude converting section 206. Amplitude converting section 206 converts the division result, which is the input, into a monotonically increasing function so that the input and output have a one-to-one relation and sends the output as an amplitude control correction value to multiplying section 114 via switching section 115.

As shown above, by calculating the ratio of the measured SIR to the reference SIR, it is possible to measure or calculate the signal to noise ratio and compare it with the pre-stored reference SIR and thus obtain the difference from the reference, thus allowing the received quality of the reception signal to be detected.

As the conversion method carried out by this amplitude converting section 206, the following method can be used for example:

Suppose an input to amplitude converting section 206 is X, an output is Y. Suppose Y is defined as follows:

$$Y = SQRT\{ABS(10 * Log10 X)\}$$

where SQRT(Z) is a function that returns a square root of Z and ABS(Z) is a function that returns an absolute value of Z.

Y, which is sent to multiplying section 114, plays a part in correcting the amplitude control value, which is the output of accumulating section 113, according to the received quality only during control of transmit power of the TPC bit. It is possible to suppress amplitude variations to a small value more than a correction that is directly proportional to errors by using a log and a square root as obtained in the mathematical expression above. That is, when error X is large it is possible to prevent correction value Y from becoming larger than necessary, reducing the load on transmission amplifier 104.

As shown above, as opposed to the conventional TPC it made up of one bit that could only transmit binary information of 0 or 1, the present embodiment makes variable the amplitude of the TPC bit in one slot during transmission, providing an additional parameter of an amplitude value, making it possible to send more information with the same one bit, transmit not only a request to increase or decrease transmit power to the far-end station but also a request of the amount of increase or decrease with the TPC bit made up of one bit, thus improving the trackability during fast fading and stability during slow fading without reducing data transmission efficiency.

That is, this method can send an instruction to increase or decrease transmit power by means of the symbol of the TPC bit made up of one bit in the reception signal and send an instruction about how much transmit power should be increased or decreased by means of the amplitude of the TPC bit, making it possible to send information of an increase or decrease of transmit power and an amount of the increase or decrease without reducing data transmission efficiency, allowing the far-end station to control transmit power responding to both fast fading and slow fading compared to transmit power control that only increases or decreases transmit power by a fixed value. Furthermore, reducing the amplitude indicating the amount of increase or decrease to 0 makes insignificant the instruction to increase or decrease indicated by the symbol of the TPC bit, thus making it possible to send an instruction to maintain the current value of transmit power, which would be impossible when only increasing or decreasing transmit power by a fixed value. Thus, the present embodiment can receive a transmit power control request from the far-end station, change transmit power accordingly and send a transmit power control request to the far-end station calculated from the received quality, thus allowing the communication quality to be maintained in an optimal state.

EMBODIMENT 2

The transmission/reception apparatus according to the present embodiment has the same configuration as that in Embodiment 1, provided, however, with a limiter to prevent the transmission amplifier from being requested to increase transmit power excessively.

The limiter can be placed 1) between the multiplying section and transmission amplifier, 2) between the received quality detecting section and switching section, 3) between the accumulating section and multiplying section and 4) between the determining section and accumulating section. Cases 1) to 4) will be explained below using FIG. 4 to FIG. 7. The parts with the same configuration as that in Embodiment 1 are assigned the same codes and their detailed explanations are omitted.

Figure 4:
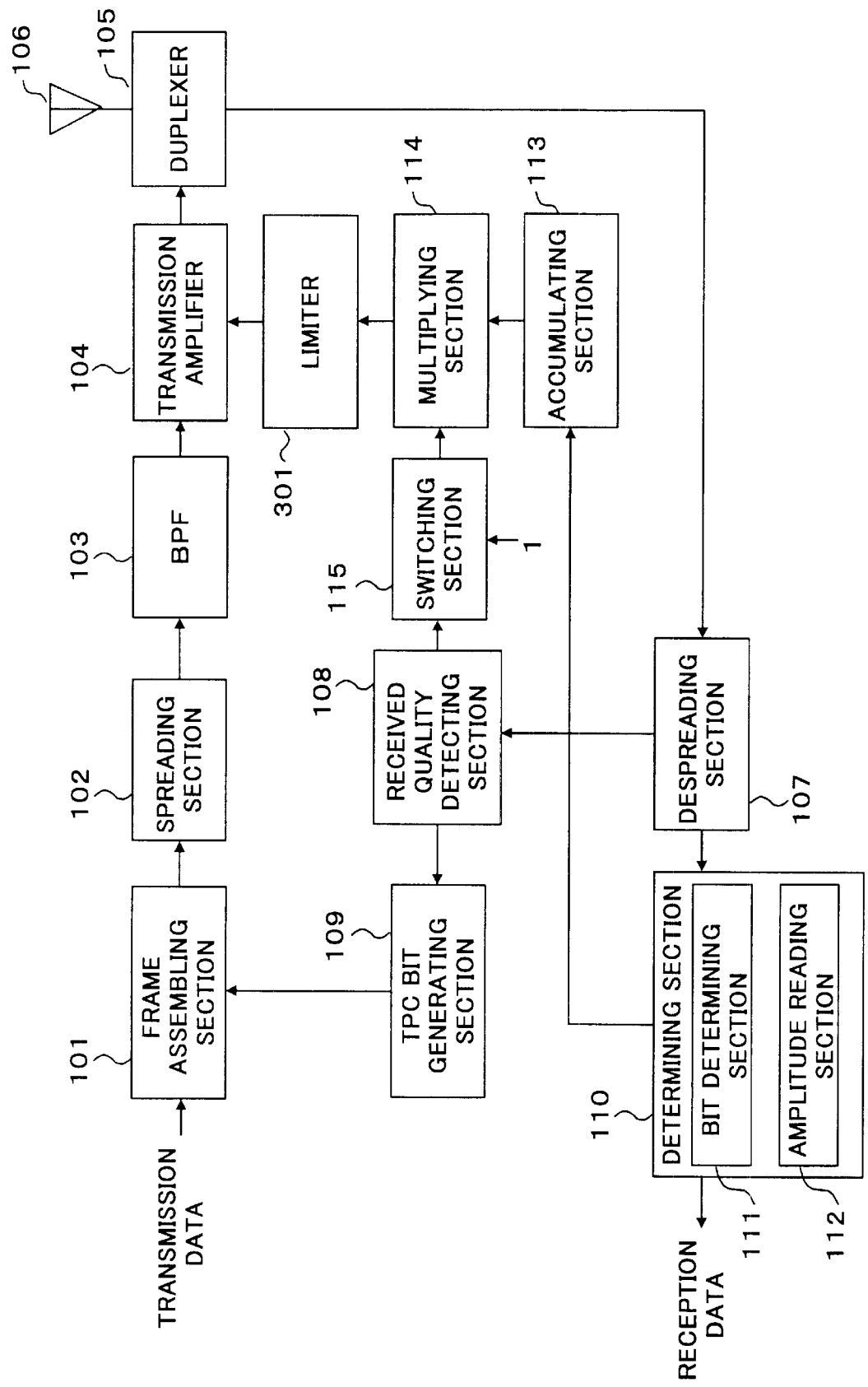
FIG. 4 is a main block diagram showing an outlined configuration of a transmission/reception apparatus with a limiter provided between a multiplying section and transmission amplifier according to Embodiment 2 of the present invention.

The configuration of the transmission/reception apparatus when a limiter is placed 1) between the multiplying section and transmission amplifier is shown in FIG. 4. In FIG. 4, an amplitude control value of transmit power sent from multiplying section 114 to transmission amplifier 104 can be limited by limiter 301. Therefore, if a communication quality deteriorates because the mobile station is located in a fading valley and a request to increase transmit power excessively is made to transmission amplifier 104 as a consequence, it is possible to limit the amplitude control value by limiter 301 to purposefully allow quality deterioration preventing excessive transmit power.

Figure 5:
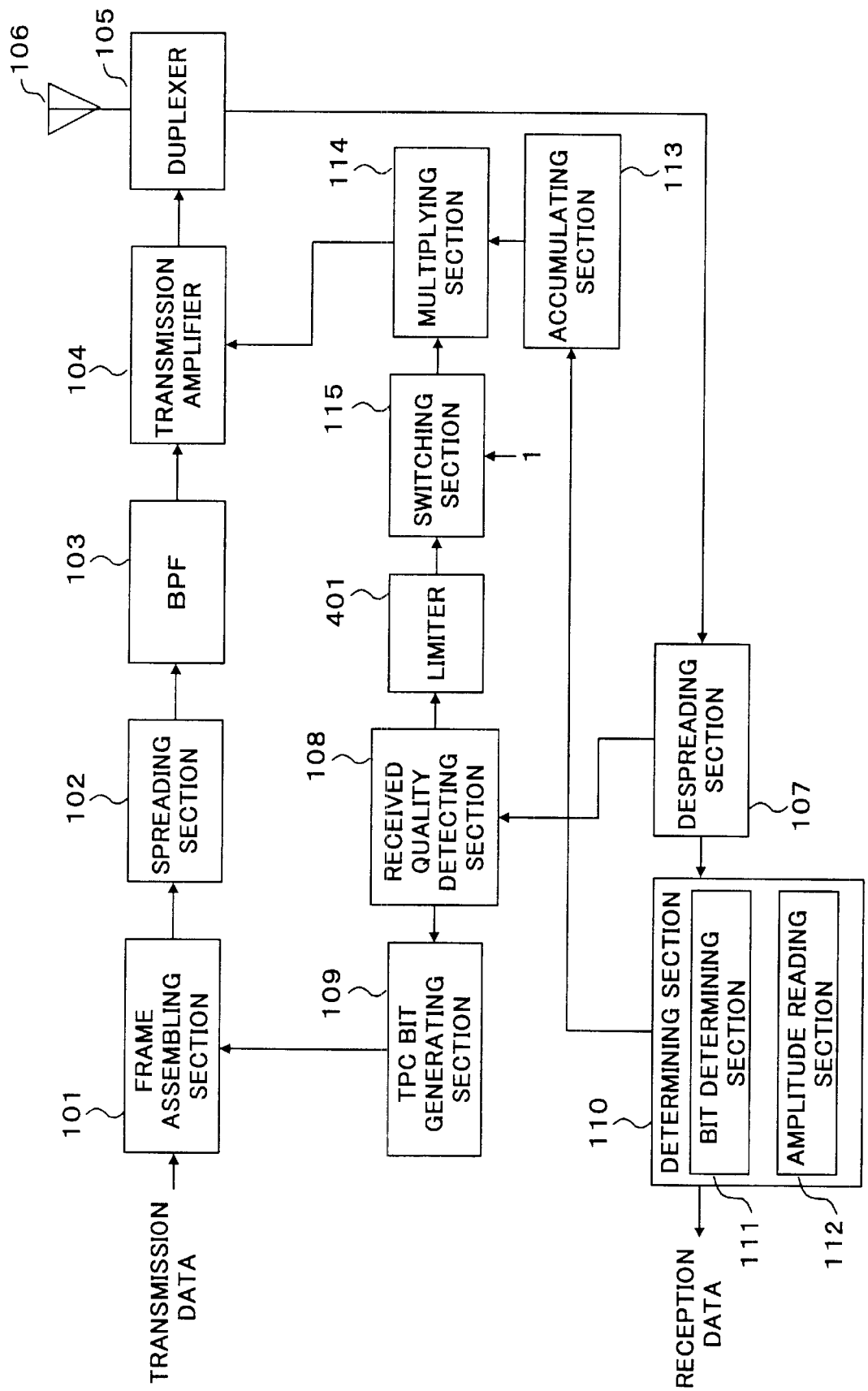
FIG. 5 is a main block diagram showing an outlined configuration of the transmission/reception apparatus with a limiter provided between a received quality detecting section and switching section according to Embodiment 2 of the present invention.

The configuration of the transmission/reception apparatus when a limiter is placed 2) between the received quality detecting section and switching section is shown in FIG. 5. In FIG. 5, it is possible to limit the amplitude control correction value to be sent from received quality detecting section 108 to multiplying section 114 via switching section 115 using limiter 401. Therefore, it is possible to prevent the detection result of received quality detecting section 108 from being disturbed due to noise or interference, prevent a value exceeding the actually necessary correction value from being output to multiplying section 114 and prevent a request for an excessive increase of transmit power.

Figure 6:
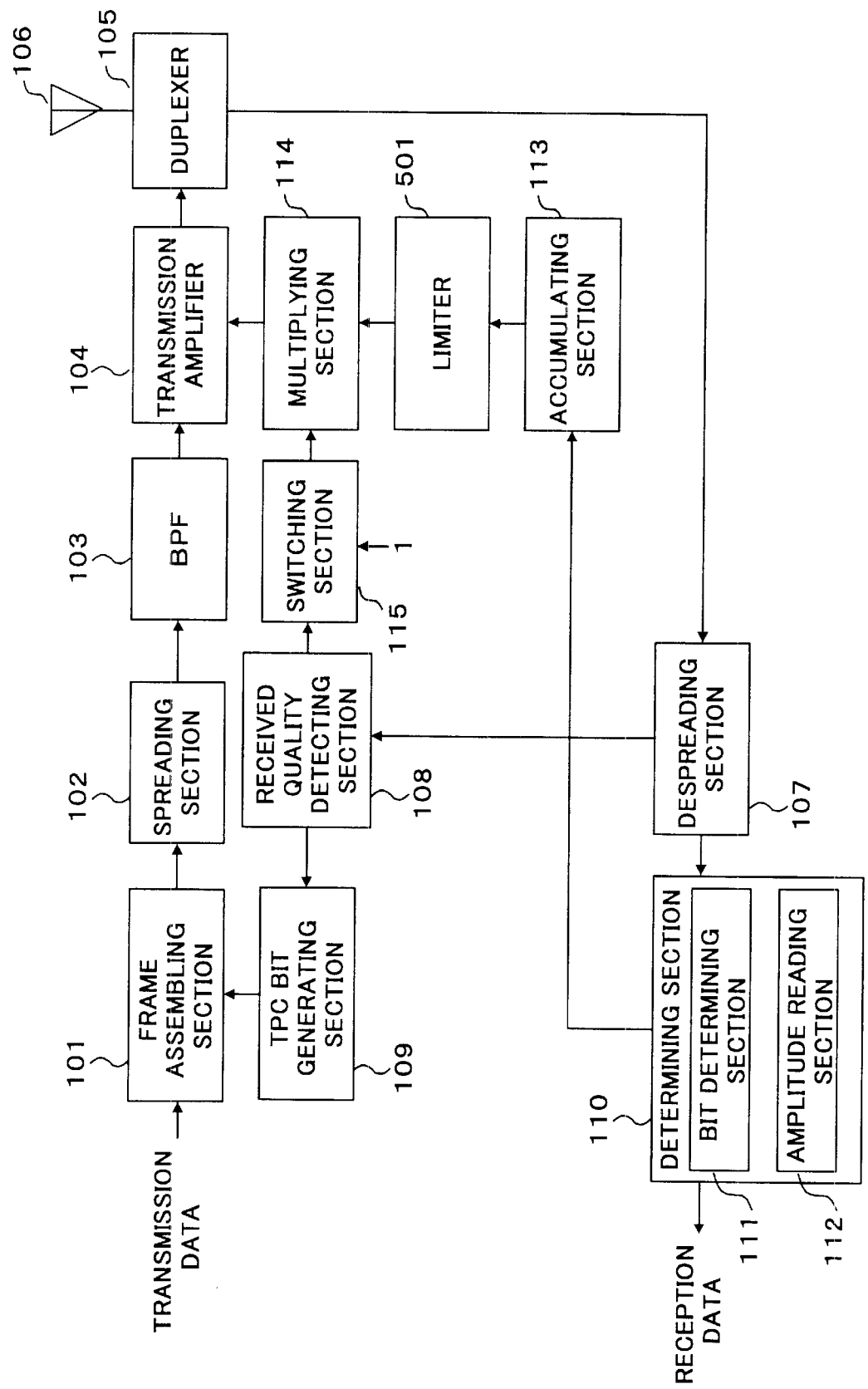
FIG. 6 is a main block diagram showing an outlined configuration of the transmission/reception apparatus with a limiter provided between an accumulating section and a multiplying section according to Embodiment 2 of the present invention.

The configuration of the transmission/reception apparatus when a limiter is placed 3) between the accumulating section and multiplying section is shown in FIG. 5. In FIG. 6, it is possible to limit the amplitude control value to be sent from accumulating section 113 to multiplying section 114 by limiter 501. Therefore, it is possible to prevent an amplitude control value exceeding the actually necessary control value output from accumulating section 113 from being output to multiplying section 114 due to noise or interference and prevent a request for an excessive increase of transmit power. Furthermore, since in 3), limitation by limiter 501 is performed before a correction by multiplying section 114, if the received original amplitude control value is large, more accurate transmit power control than in case 1) where control is performed after a correction by multiplying section 114 can be performed.

Figure 7:
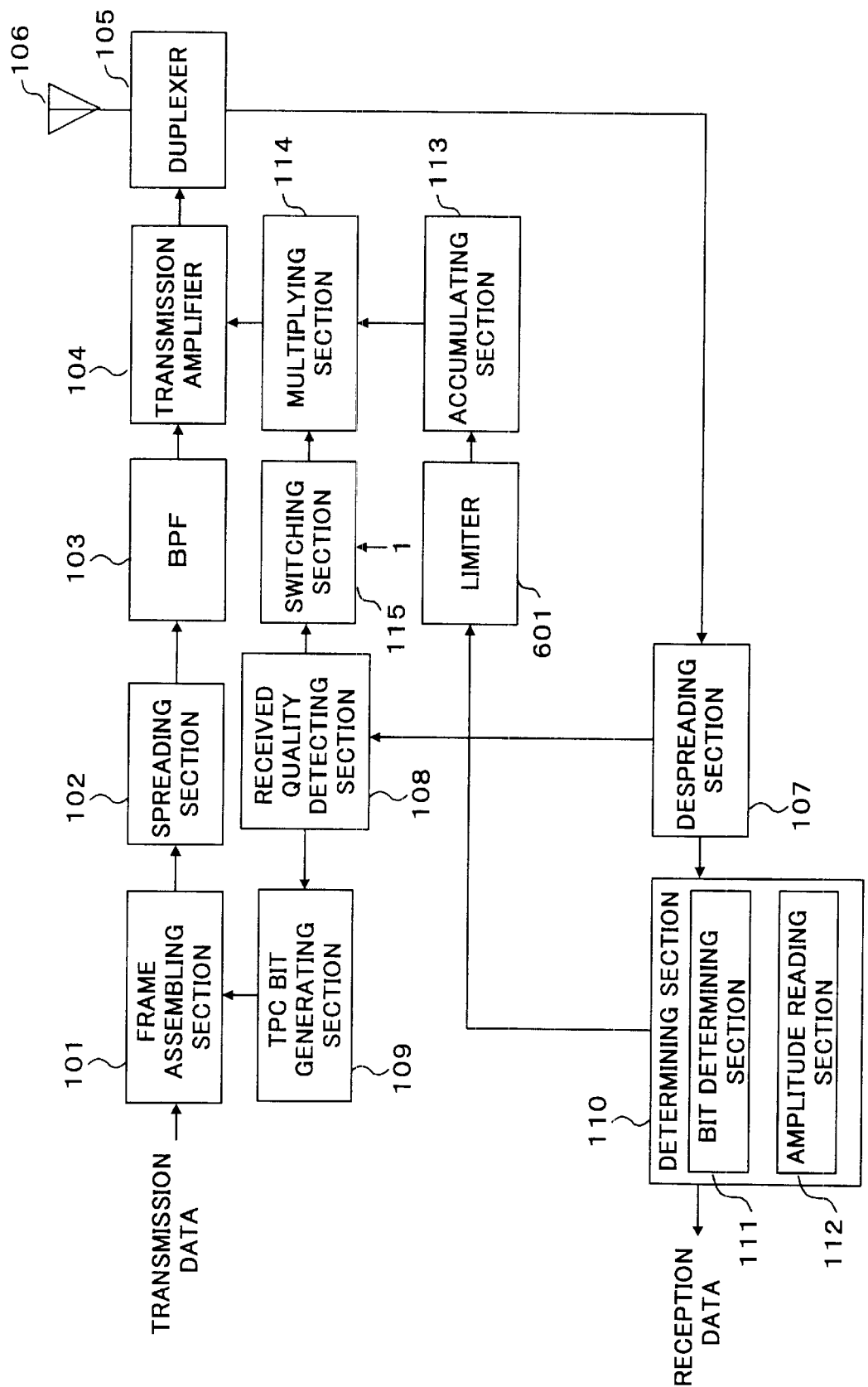
FIG. 7 is a main block diagram showing an outlined configuration of the transmission/reception apparatus with a limiter provided between a determining section and accumulating section according to Embodiment 2 of the present invention.

The configuration of the transmission/reception apparatus when a limiter is placed 4) between the determining section and accumulating section is shown in FIG. 7. In FIG. 7, it is possible to limit an amplitude value to be sent from amplitude reading section 112 to accumulating section 113 by limiter 601. Therefore, it is possible to prevent an amplitude control value exceeding the actual amplitude value from being output to multiplying section 114 due to noise or interference and prevent a request for an excessive increase of transmit power.

By the way, the limiter locations 1) to 4) above can be established at the same time, and therefore the limiters can be used in any combinations thereof.

Thus, Embodiment 2 can prevent any excessive load from applying to transmission amplifier 104, thus improving stability of the apparatus.

EMBODIMENT 3

The present embodiment explains a case where in compressed mode, an increase or decrease and an amount of the increase or decrease of transmit power are indicated by the symbol and amplitude of the TPC bit. Here, the compressed mode refers to a mode in which the spreading factor for data being transmitted continuously is reduced and transmission is performed with power of the part corresponding to the changed spreading factor increased instead, thus compressing the transmission time as shown in FIG. 9 and FIG. 10. The compressed mode is sometimes also called "slotted mode."

The compressed mode allows other carriers to be monitored during a free time spared by compressing the transmission time. This allows information of different carriers to be monitored without reducing the amount of information transmitted during a communication. In this case, it is possible to monitor the communication and different carriers through a single reception section.

Figure 10A:
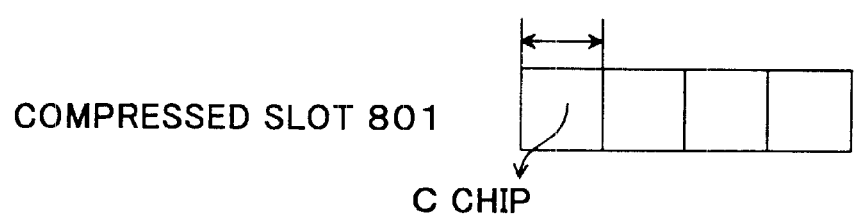
FIG. 10A and FIG. 10B are slot diagrams to explain a compressed mode.
Figure 10B:
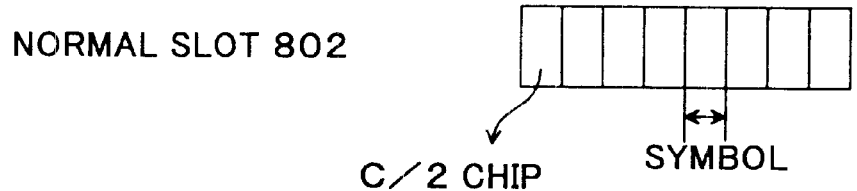

For example, if the spreading factor corresponding to normal slot 801 is C as shown in FIG. 10A, the spreading factor is set to C/2 in compressed mode and compressed slot 802 as shown in FIG. 10B is provided. That is, in compressed mode, for frames a and b being transmitted continuously as shown in FIG. 9A, compressed slots are used for the first half of frame a and the last half of frame b as shown in FIG. 9B (for example, the spreading actor is C/2 and power is twice that of normal slot 801).

At this time, a transmission stop period (pause interval; here 10 ms, for example) is produced, and so different carriers are monitored using this period. That is, during compressed slot 802, reception is carried out with frequency f1 and frequency f2 is monitored while transmission is stopped.

Figure 8:
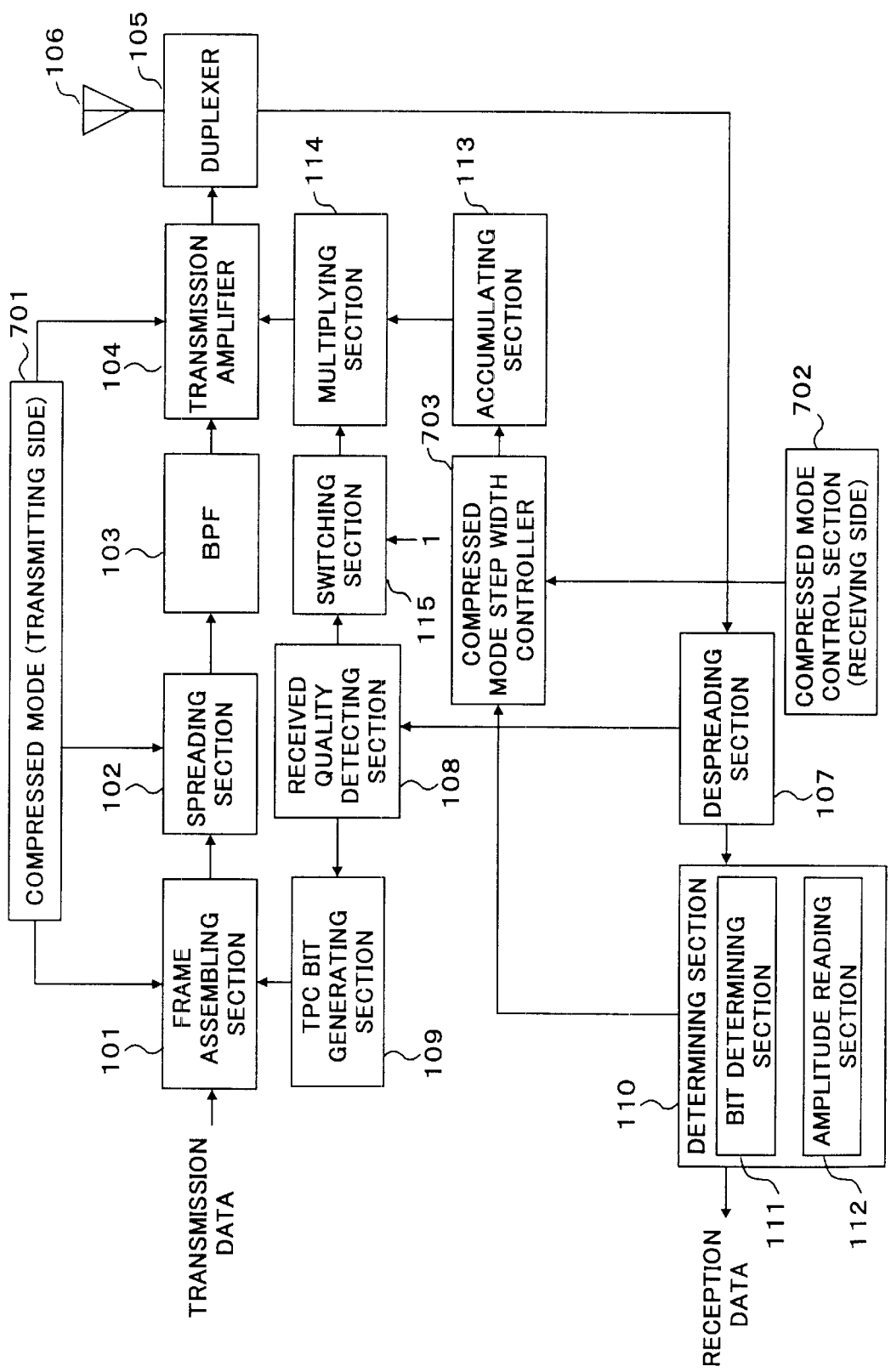
FIG. 8 is a main block diagram showing an outlined configuration of a transmission/reception apparatus according to Embodiment 3 of the present invention.

FIG. 8 is a main block diagram showing an outlined configuration of the transmission/reception apparatus according to Embodiment 3 of the present invention. The parts with the same configuration as that in Embodiment 1 are assigned the same codes and their detailed explanations are omitted. Also suppose the compressed mode on the transmitting side and the compressed mode on the receiving side are asynchronous (independent events).

The transmission/reception apparatus shown in FIG. 8 comprises compressed mode control section (receiving side) 702 that recognizes whether the system is in compressed mode or not, compressed mode step width controller 703 that controls the step width of transmit power control in compressed mode and controls transmit power using the sign and amplitude of a transmit power control bit which indicates an increase or decrease and an amount of the increase or decrease of transmit power when the compressed mode is canceled and compressed mode control section (transmitting side) 701 that indicates whether the system is in compressed mode or not.

Here, compressed mode control section (receiving side) 702 controls compressed mode step width controller 703 so that transmit power control for the compressed mode is carried out at the time of the compressed mode and transmit power control is performed when the compressed mode is canceled based on the symbol and amplitude of the transmit power control signal.

The operation of the transmission/reception apparatus with the configuration above is explained. First, on the transmitting side, when compressed mode control section (transmitting side) 701 decides to perform transmission in compressed mode, this instruction is output to frame assembling section 101, spreading section 102 and transmission amplifier 104.

Frame assembling section 101 performs frame formatting for compressed slot 802 as shown in FIG. 9B and further specifies a spreading code with a spreading factor ½ of that of normal slot 801 to create compressed slot 802. Furthermore, frame assembling section 101 instructs transmission amplifier 104 so that transmission is not performed during the compressed mode.

On the receiving side, if compressed mode control section (receiving side) 702 recognizes and decides the compressed mode, it can no longer receive the transmit power control bit in the meantime, and thus gives the instruction to compressed mode step width controller 703 and performs special transmit power control during the compressed mode.

This special transmit power control can be, for example, control that outputs 0 as the transmit power control bit during the compressed mode to prevent a value before entering the compressed mode from changing, control that gives a change predicted from past variations, or control that gradually reduces transmit power, etc. There are no special restrictions on special transmit power control in this compressed mode.

In compressed mode, transmit power control is not performed appropriately, and therefore when the compressed mode is canceled, a transmit power control error is by far larger than during normal continuous transmission. However, since the present embodiment controls an increase or decrease and an amount of the increase or decrease of transmit power control using the symbol and amplitude of the transmit power signal, and especially transmit power control steps can be made variable by means of the amplitude of the transmit power control bit, it is possible to compensate the transmit power control error soon after the compressed mode is canceled, making it possible to reduce interference with other users and secure the quality of the own transmission signal.

Figure 11:
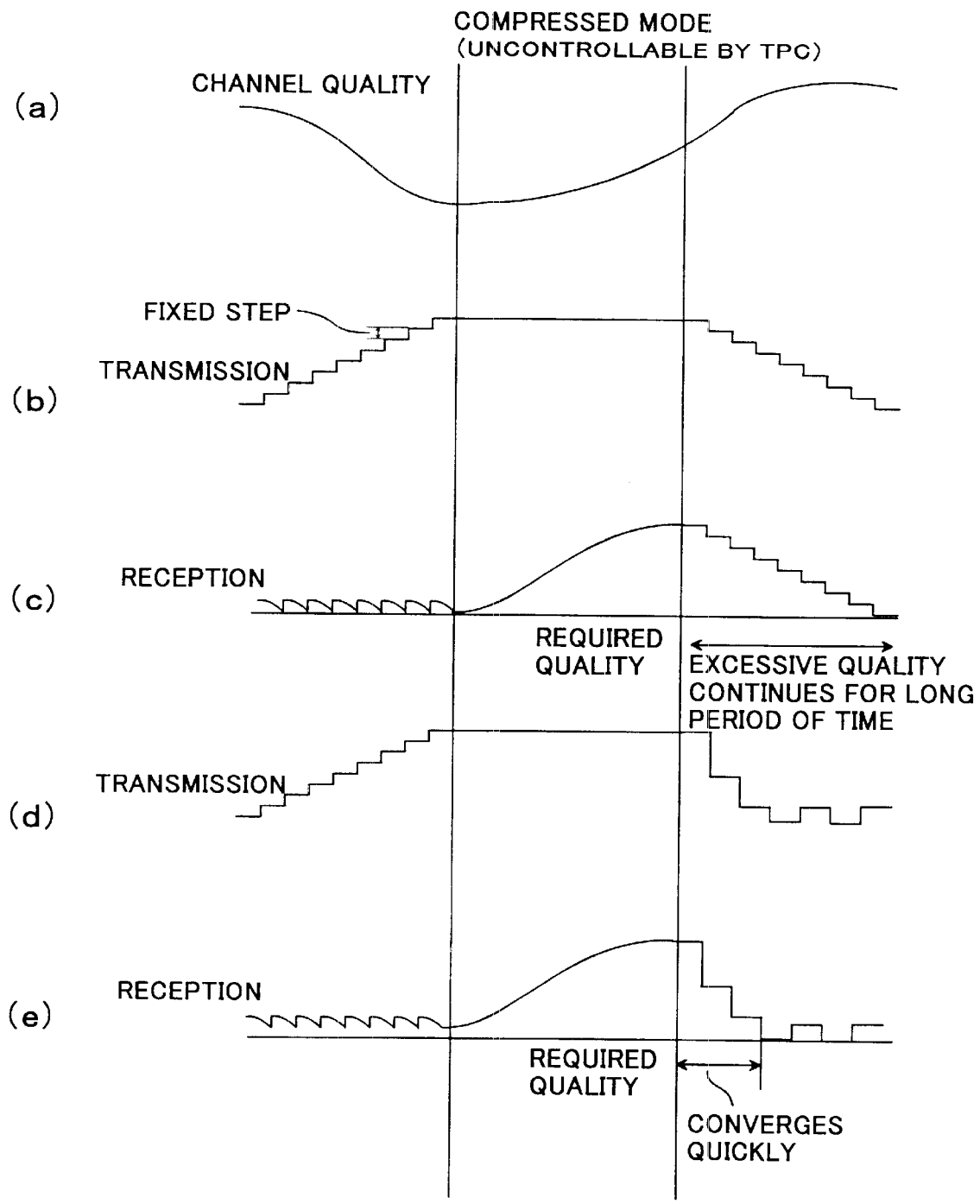
FIG. 11 is are drawings showing variations of a channel quality to explain transmit power control in Embodiment 3 of the present invention.
Figure 12:
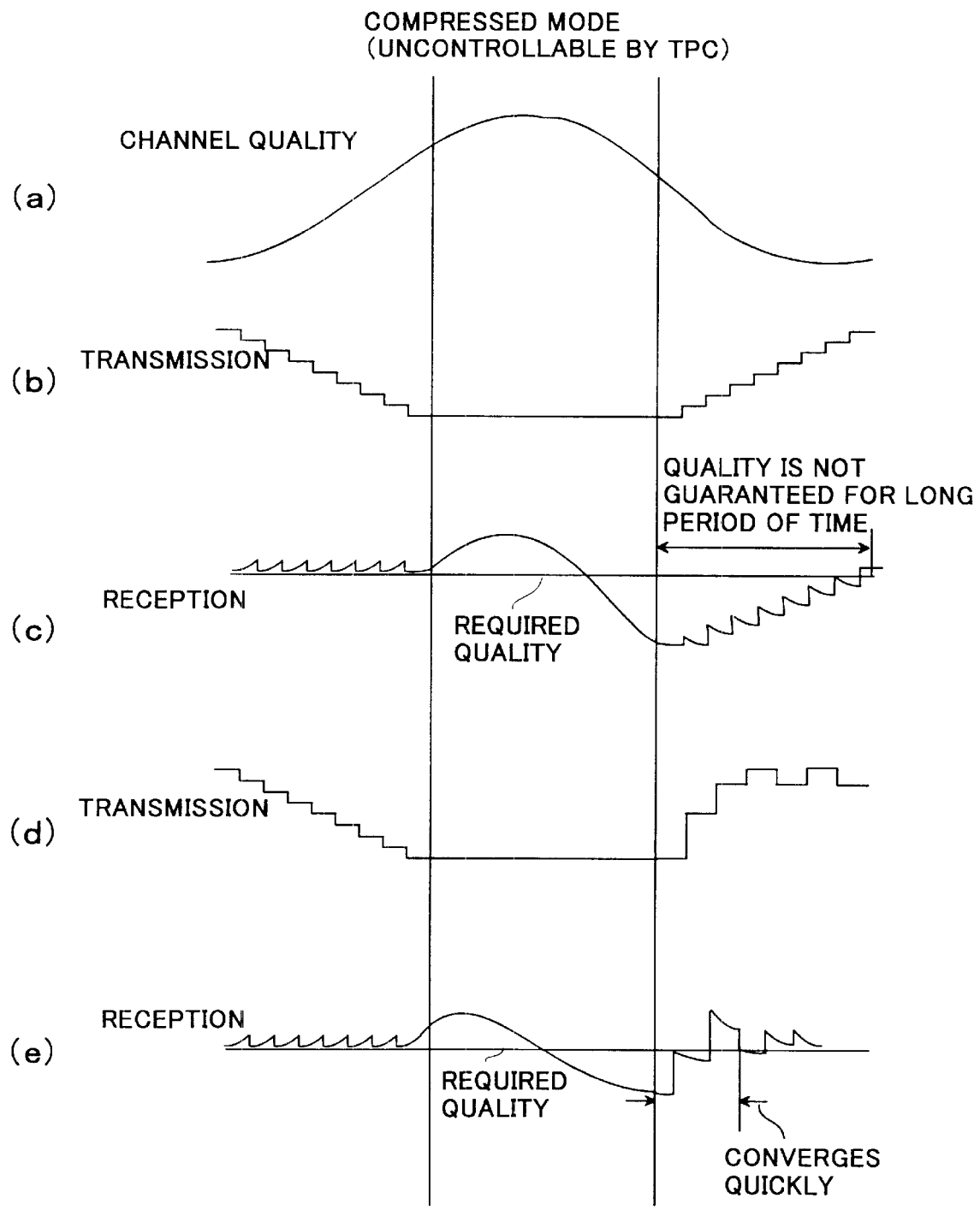
FIG. 12 are other drawings showing variations of the channel quality to explain transmit power control in Embodiment 3 of the present invention.

The trackability status of transmit power control for channel variations according to the present embodiment is explained using FIG. 11 and FIG. 12. Curve (a) in FIG. 11 and FIG. 12 indicates a variation of the channel quality. According to the conventional transmit power control method, transmit power control on the transmitting side is as shown in (b) and a variation of the received quality on the receiving side is as shown in (c). In this case, for an excessive quality after the compressed mode is canceled, it takes a long period of time to return to an appropriate quality as shown in (c) in FIG. 11, and the quality after the compressed mode is canceled is not guaranteed for a long period of time as shown in (c) in FIG. 12.

On the other hand, according to the transmit power control method of the present embodiment, transmit power control on the transmitting side is as shown in (d) and a variation of the received quality on the receiving side is as shown in (e). Since this transmit power control method is the same as that in Embodiments 1 and 2, specific explanations are omitted. That is, the transmitting side can make transmit power control steps variable by means of the amplitude of the transmit power control bit, and thus can dynamically compensate a large transmit power control error after the compressed mode is canceled and converge to the desired quality quickly.

As shown above, the transmission/reception apparatus according to the present embodiment performs transmit power control by an arbitrary amount of increase or decrease using the symbol and amplitude of the TPC bit made up of one bit as parameters, and can therefore achieve trackability that quickly reduces a large transmit power control error caused by a failure to control transmit power in compressed mode, and quickly respond to variations in the channel quality.

EMBODIMENT 4

The transmission/reception apparatus according to the present embodiment has the same configuration as that in Embodiment 3, provided, however, with a period during which transmission is performed with a transmission amplitude value greater than an amplitude value calculated through transmit power control immediately before a pause interval.

Figure 13:
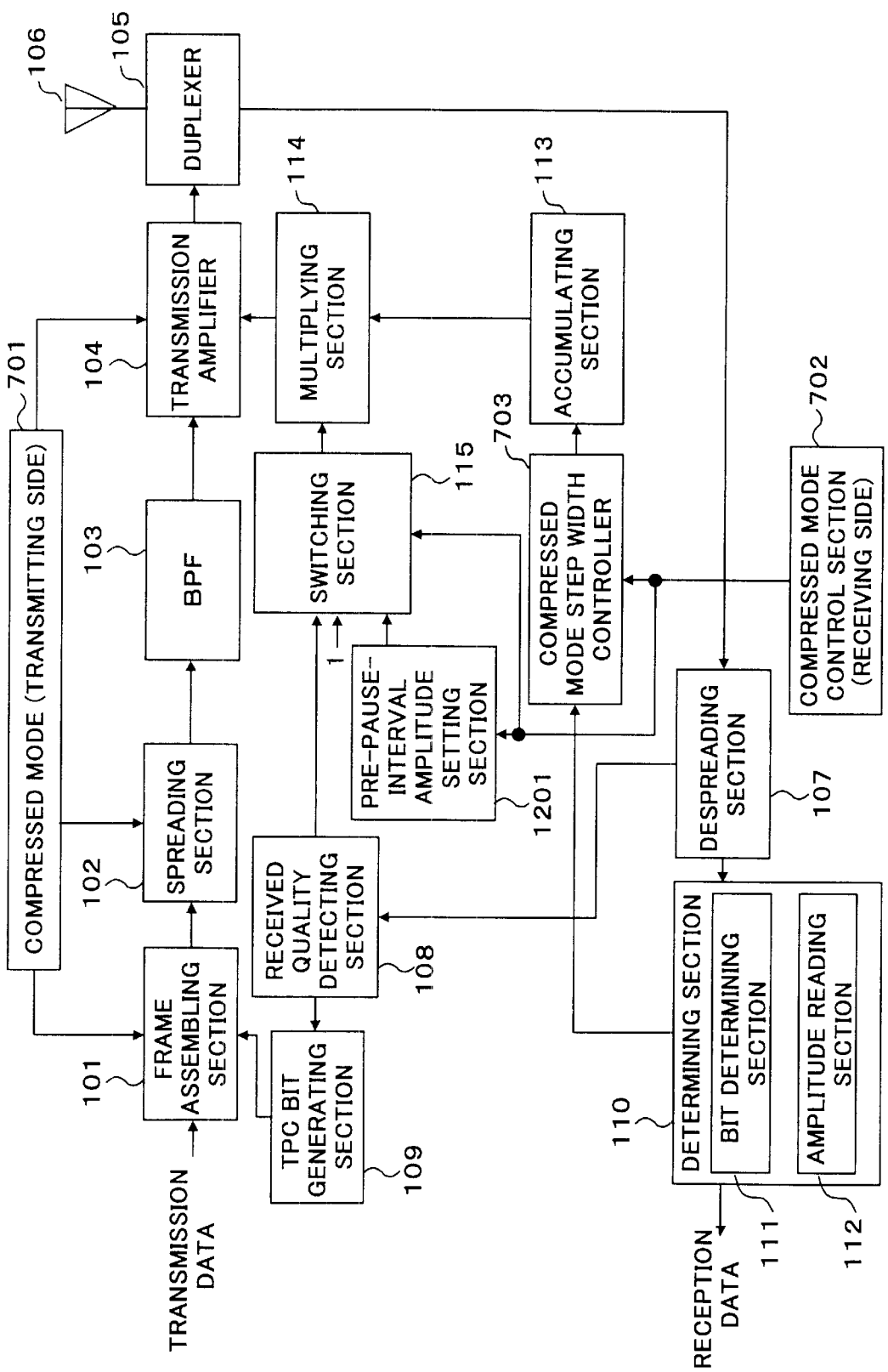
FIG. 13 is a main block diagram showing an outlined configuration of a transmission/reception apparatus according to Embodiment 4 of the present invention.
Figure 14:
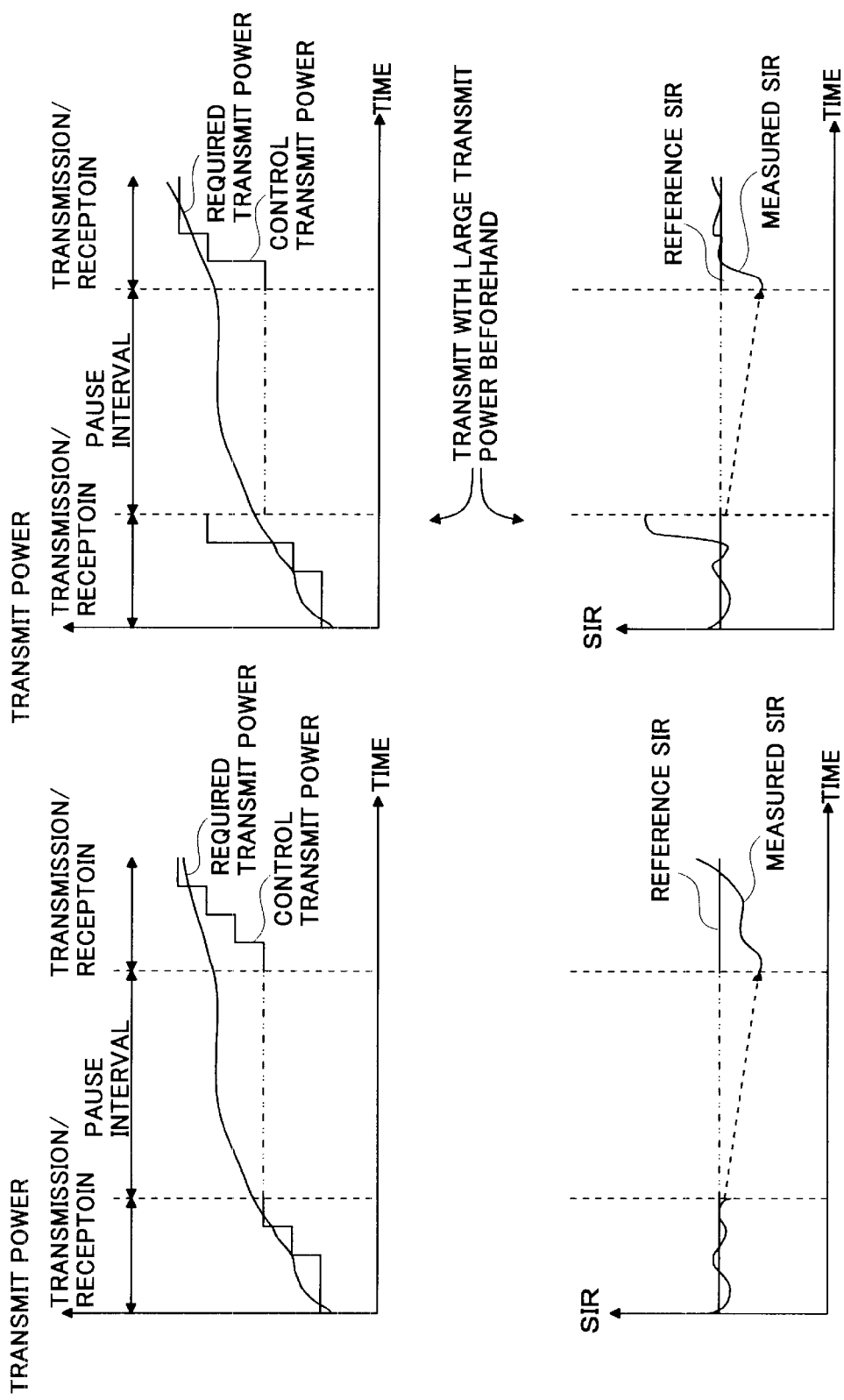
FIG. 14A are graphs showing variations of conventional control transmit power and SIR.
FIG. 14B are graphs showing variations of control transmit power and SIR to explain transmit power control according to Embodiment 4 of the present invention.

The transmission/reception apparatus according to the present embodiment will be explained using FIG. 13 and FIG. 14. FIG. 13 is a main block diagram showing an outlined configuration of the transmission/reception apparatus according to Embodiment 4 of the present invention and FIG. 14 are graphs showing variations of transmit power and SIR to explain transmit power control in Embodiment 4 of the present invention. The parts with the same configuration as that in Embodiment 3 are assigned the same codes and their explanations are omitted.

In FIG. 13, pre-pause-interval amplitude setting section 1201 generates an instruction to drastically increase control transmit power for a certain period of time immediately before a pause interval from the level during normal control independently of the level of required transmit power and transmits control transmit power to multiplying section 114 via switching section 115.

Since the start and end timings of the pause interval are already known in compressed mode, pre-pause-interval amplitude setting section 1201 and switching section 115 can easily know the pause interval start timing from compressed mode control section (receiving side) 702, thus making the above control possible.

Then, transmit power control according to the present embodiment is explained using FIG. 14. FIG. 14A are graphs showing variations of control transmit power and measured SIR during conventional transmit power control with a fixed amount of control and FIG. 14B are graphs showing variations of control transmit power and measured SIR during transmit power control according to the present embodiment.

According to conventional transmit power control as shown in FIG. 14A, if required transmit power continues to increase during the pause interval, the SIR deteriorates drastically when the pause interval ends and transmission/reception restarts. Canceling this deterioration in the shortest possible time is the objective of Embodiment 3.

The present embodiment performs transmission with a transmit amplitude value larger than an amplitude value calculated from transmit power control for a certain period of time immediately before the pause interval, that is, an amplitude value for approximating to the required transmit power value, and creates an interval during which the measured SIR by far exceeds the reference SIR beforehand even if the SIR drops because control transmission power is much less than the required transmission power at the time of the restart of transmission/reception after the end of the pause interval and the received quality deteriorates until control transmission power follows the required transmission power, thereby making it possible to maintain the quality as a whole.

In this way, the present embodiment provides a period in which transmission is performed with a transmission amplitude value larger than the amplitude value calculated through transmission power control immediately before the pause interval, thereby making it possible to alleviate the influence of deterioration of the received quality due to a drop of the measured SIR after the end of the pause interval.

EMBODIMENT 5

The transmission/reception apparatus according to the present embodiment has the same configuration as that in Embodiment 3, provided, however, with a period during which transmission is performed with transmit power exceeding the required transmit power immediately after a pause interval.

Figure 15:
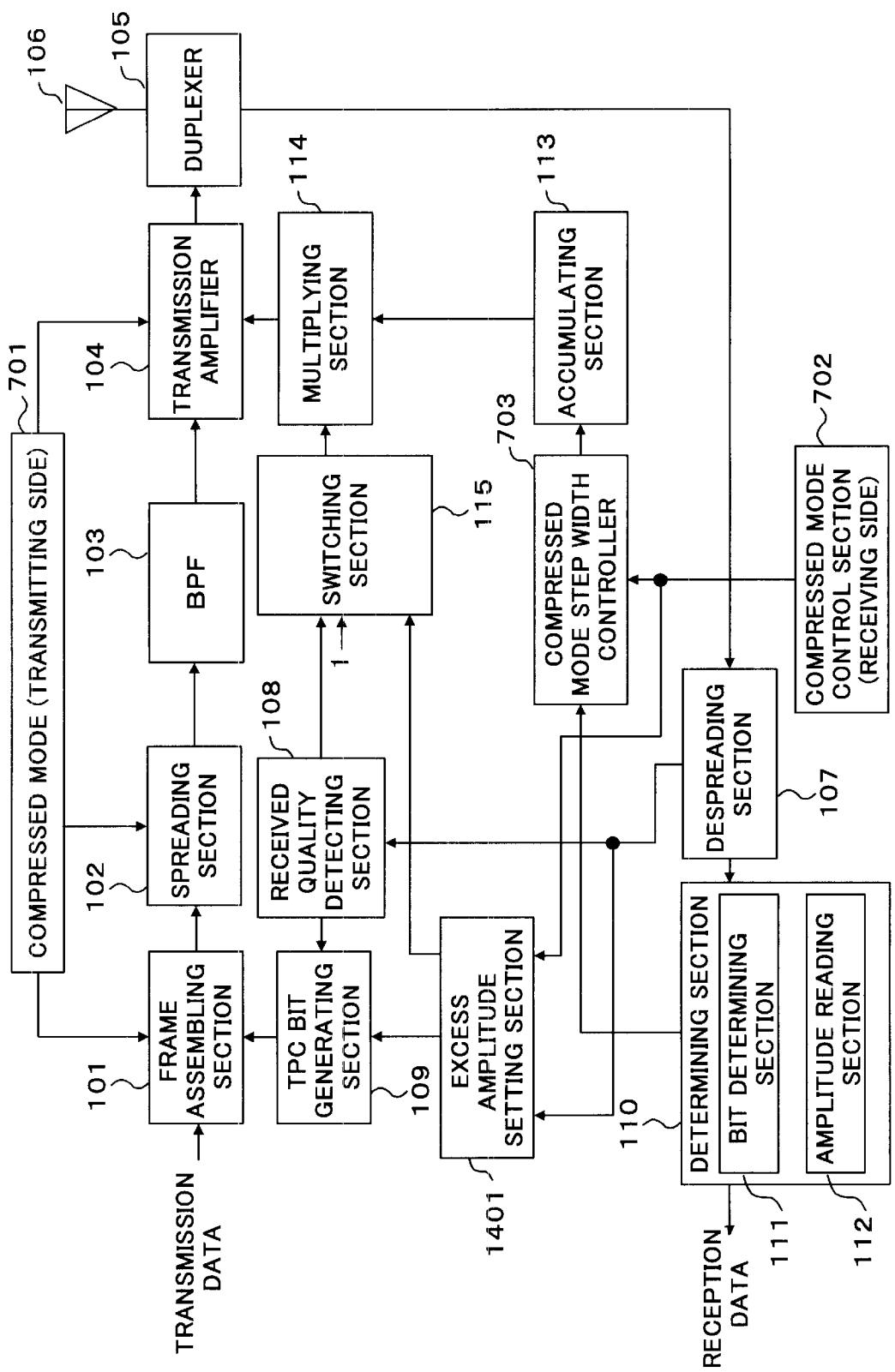
FIG. 15 is a main block diagram showing an outlined configuration of a transmission/reception apparatus according to Embodiment 5 of the present invention.

The transmission/reception apparatus according to the present embodiment will be explained using FIG. 15 and FIG. 16. FIG. 15 is a main block diagram showing an outlined configuration of the transmission/reception apparatus according to Embodiment 5 of the present invention and FIG. 16 are graphs showing variations of transmit power and SIR to explain transmit power control in Embodiment 5 of the present invention. The parts with the same configuration as that in Embodiment 3 are assigned the same codes and their explanations are omitted.

In FIG. 15, excess amplitude setting section 1401 acquires a measured SIR from despreading section 107, further acquires the pause interval start and end timings from compressed mode control section (receiving side) 702, and sets correction values of the symbol and amplitude of the TPC bit to perform control such that if there exists a pause interval, control transmit power is further increased even after control transmit power satisfies the required transmit power for a predetermined period of time after the pause interval, and outputs the symbol to TPC bit generating section 109 and the correction values to switching section 115. TPC bit generating section 109 generates a TPC bit based on the output of excess amplitude setting section 1401 and transmits the TPC bit to frame assembling section 101.

Then, power control of the present embodiment will be explained using FIG. 16. FIG. 16 are graphs showing variations of control transmit power and measured SIR when performing transmit power control according to the present embodiment.

As shown in FIG. 16, the present embodiment performs transmit power control so that transmit power is further increased for a predetermined period of time after the end of the pause interval even after control transmit power satisfies the required transmit power. The amount of increase or decrease at that time is variable.

As shown in the figures, since performing such power control modifies transmit power excessively even after a measured SIR satisfies a reference SIR, it is possible to maintain the quality as a whole even if the SIR drops at the time of the restart of transmission/reception after the end of the pause interval because control transmission power is much less than the required transmission power and the received quality deteriorates until control transmission power follows the required transmission power.

In this way, the present embodiment modifies transmit power excessively even after the required transmit power is satisfied after the end of the pause interval, thereby making it possible to alleviate the influence of deterioration of the received quality due to a drop of the measured SIR on the receiving side after the pause interval.

EMBODIMENT 6

The transmission/reception apparatus according to the present embodiment has the same configuration as that in Embodiment 3, provided, however, with an offset value added to the transmit power value immediately after the end of the pause interval.

Figure 17:
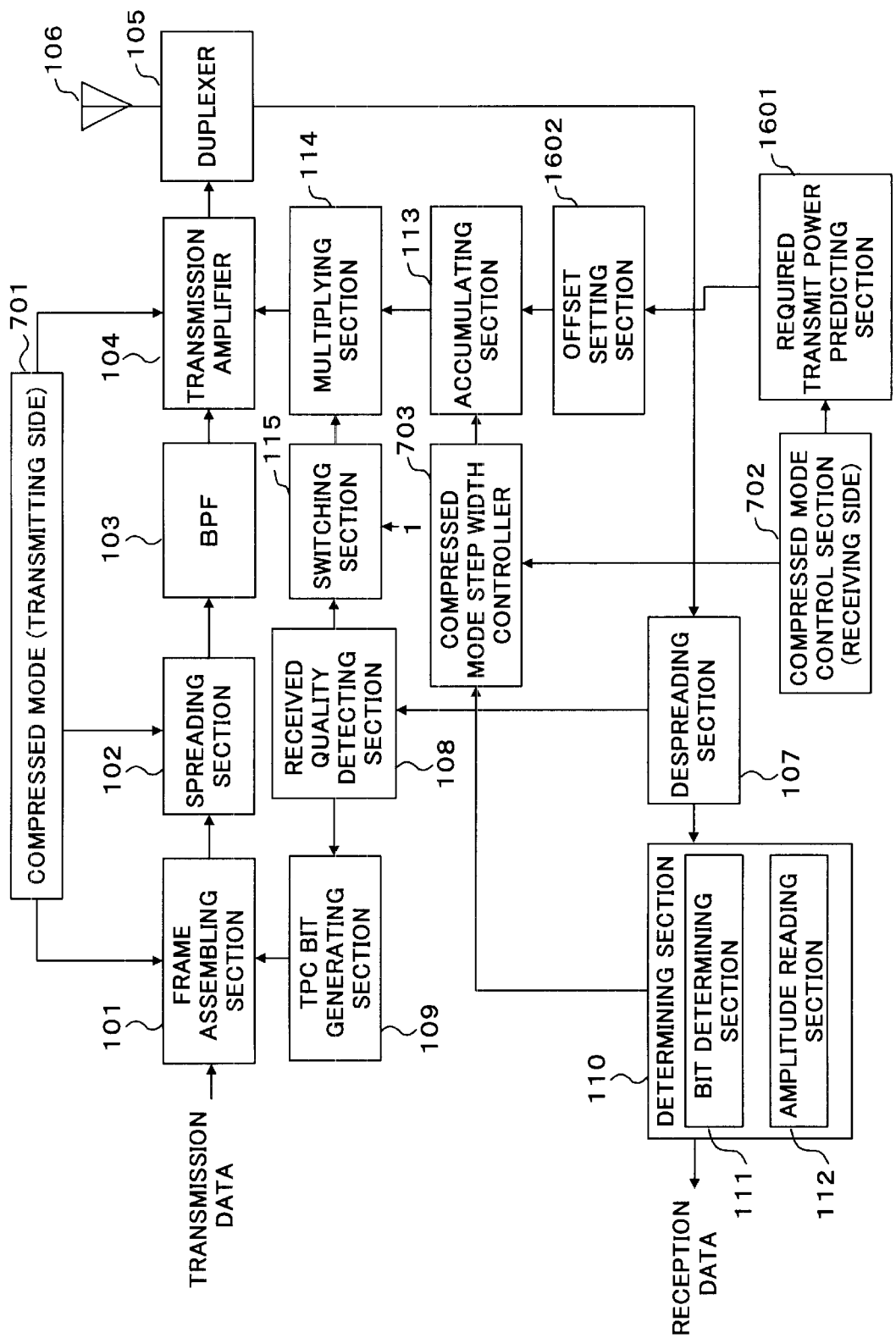
FIG. 17 is a main block diagram showing an outlined configuration of a transmission/reception apparatus according to Embodiment 6 of the present invention.
Figure 18:
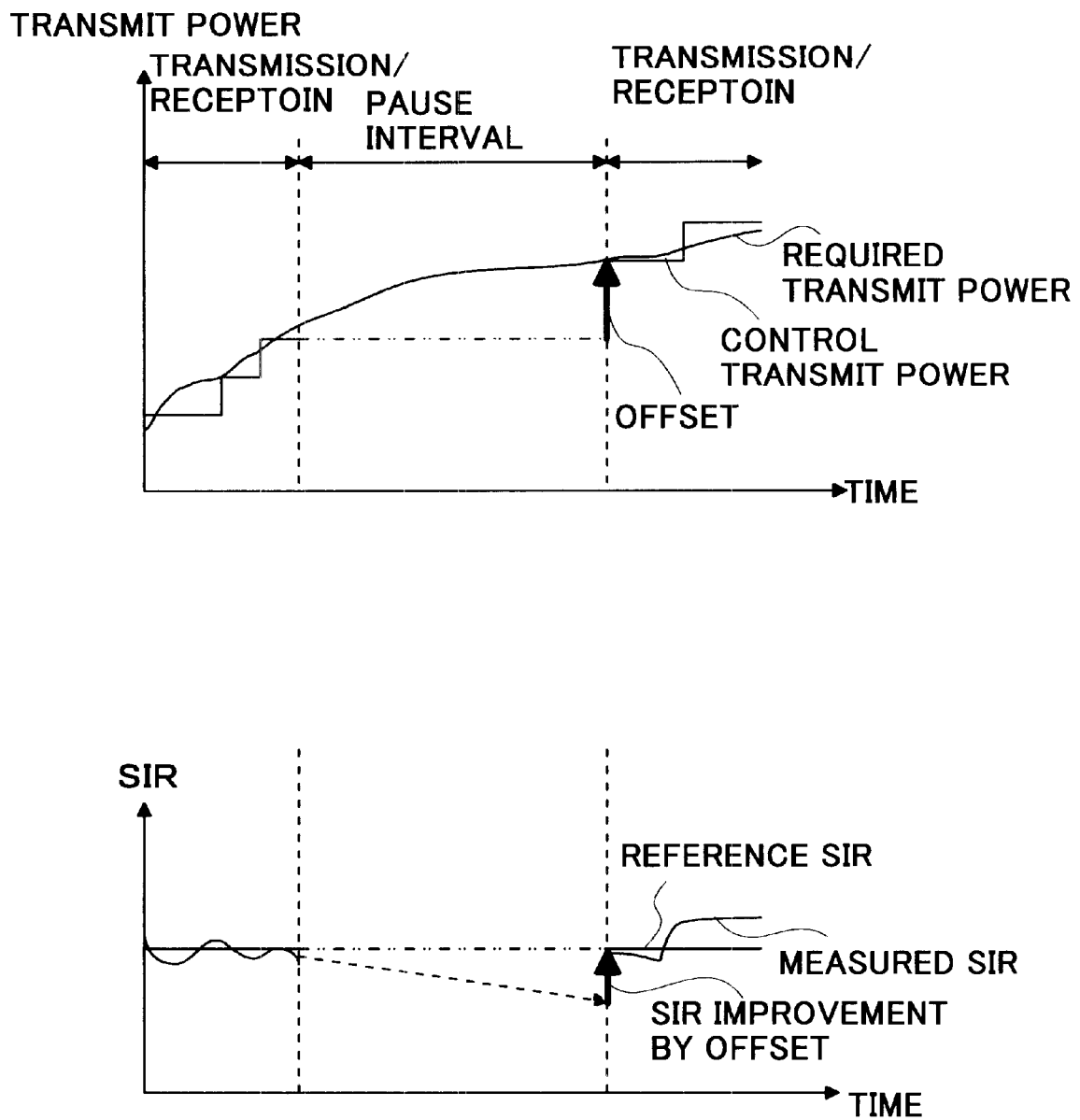
FIG. 18 are graphs showing variations of control transmit power and SIR to explain transmit power control according to Embodiment 6 of the present invention.

The transmission/reception apparatus according to the present embodiment will be explained using FIG. 17 and FIG. 18. FIG. 17 is a main block diagram showing an outlined configuration of the transmission/reception apparatus according to Embodiment 6 of the present invention and FIG. 18 are graphs showing variations of transmit power and SIR to explain transmit power control in Embodiment 6 of the present invention. The parts with the same configuration as that in Embodiment 3 are assigned the same codes and their explanations are omitted.

In FIG. 17, required transmit power predicting section 1601 acquires the pause interval start and end timings from compressed mode control section (receiving side) 702 and, if there exists a pause interval, predicts transmit power necessary to satisfy a reference SIR on the receiving side after the end of the pause interval and outputs the predicted transmit power to offset setting section 1602. Offset setting section 1602 sets an offset value of transmit power based on the prediction result and outputs the offset value to accumulating section 113.

Then, power control of the present embodiment will be explained using FIG. 18. FIG. 18 are graphs showing variations of control transmit power and measured SIR when performing power control according to the present embodiment.

As shown in FIG. 18, in the present embodiment, the first control transmit power value when transmission/reception is restarted after the end of the pause interval is the control transmit power value immediately before the beginning of the pause interval plus a calculated offset value. That is, the offset value is calculated by predicting a required transmit power value at the time of the restart of transmission/reception after the end of the pause interval in such a way that the control transmit power value at the time of the restart matches the required transmit power value. This makes it possible to minimize the difference between the required transmit power value at the time of restarting transmission/reception and control transmit power value and shorten the period in which the measured SIR is low.

In this way, using the control transmit power value immediately before the pause interval is started plus the calculated offset value as the first control transmit power value when transmission/reception is restarted after the end of the pause interval, the present embodiment can minimize the difference between the required transmit power value at the time of restarting transmission/reception and control transmit power value and shorten the period in which the measured SIR is low, thus making it possible to alleviate deterioration of the received quality after the pause interval.

By the way, the method of predicting the required transmit power immediately after the end of the pause interval is arbitrary in the present embodiment and one example of this can be a method of using the number of symbols or sum of amounts of increase or decrease of the TPC bit before the pause interval as a standard.

EMBODIMENT 7

The transmission/reception apparatus according to the present embodiment has the same configuration as that in Embodiment 3, carrying out, however, chip interleaving.

Figure 19:
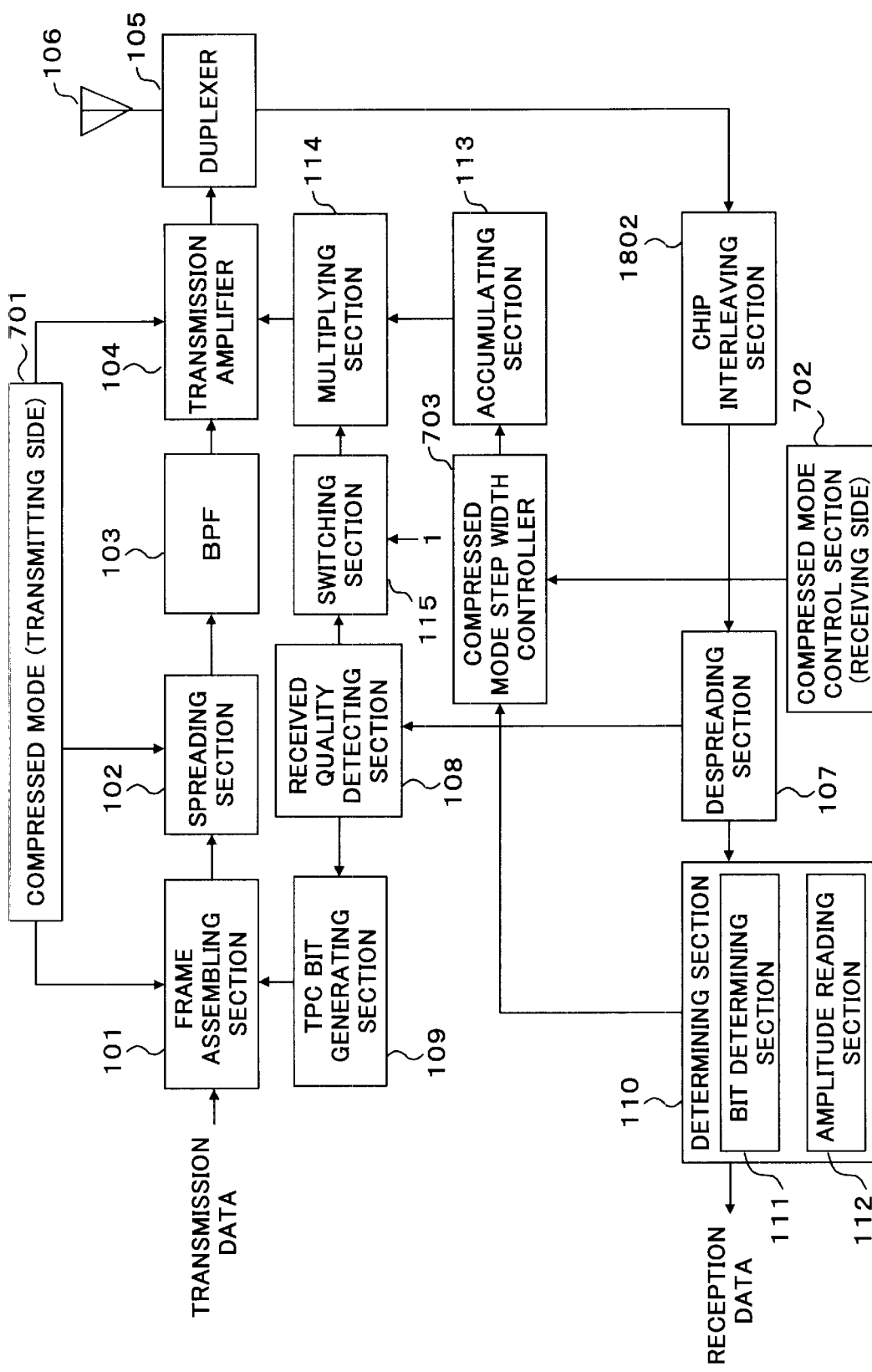
FIG. 19 is a main block diagram showing an outlined configuration of a transmission/reception apparatus according to Embodiment 7 of the present invention.
Figure 20:
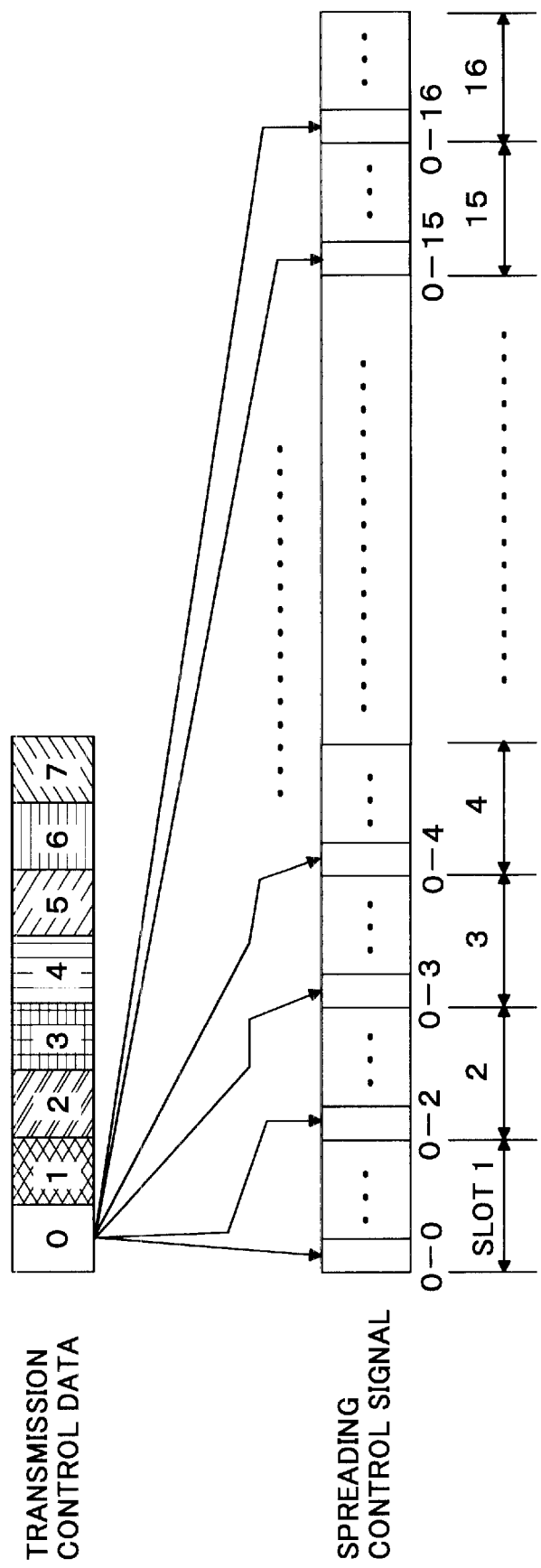
FIG. 20 is a schematic diagram showing a frame format example to explain chip interleaving.

The transmission/reception apparatus according to the present embodiment will be explained using FIG. 19 and FIG. 20. FIG. 19 is a main block diagram showing an outlined configuration of the transmission/reception apparatus according to Embodiment 7 of the present invention and FIG. 20 is a schematic diagram to show a frame format example to explain chip interleaving. The parts with the same configuration as that in Embodiment 3 are assigned the same codes and their explanations are omitted.

In FIG. 19, chip interleaving section 1801 subjects each chip of a spread transmission signal to interleaving and chip deinterleaving section 1802 rearranges a reception signal in the reverse order of transmission chip interleaving.

Then, the frame format when performing chip interleaving will be explained using FIG. 20. FIG. 20 shows an example of ×16 spreading with 8 symbols per one slot.

In FIG. 20, symbol 0 is spread over 16 chips. At this time, the 16 chips are not placed in sequential positions but in groups of 8 chips. This results in chips about one symbol distributed to a plurality of slots. Thus, chips about one symbol are distributed to slots with a high signal quality and slots with a poor signal quality, which allows the receiving side to maintain each symbol to a certain level of quality. This produces a difference between the required transmit power and control transmit power after the end of the pause interval and even if slots of a poor signal quality are produced, the deterioration of the symbols in those slots can be compensated by symbols of slots with a high signal quality, thus making it possible to maintain the signal quality.

In this way, the present embodiment performs transmit power control by an arbitrary amount of increase or decrease, and thus can provide trackability that quickly reduces a large transmit power control error caused by a failure to control transmit power in compressed mode and average the received quality of each symbol by carrying out chip interleaving, thus making it possible to alleviate deterioration of the received quality after the pause interval.

By the way, when applying chip interleaving to the present invention, a specific method of chip interleaving or chip deinterleaving can be determined arbitrarily and is not limited to the values described here.

The present invention is not limited to Embodiments 1 to 7 above, but can be implemented with various modifications. For example, Embodiments 1 to 7 above can be implemented in combinations thereof as appropriate.

Embodiments 4 to 7 are applicable to transmit power control when a compressed mode is used and is also applicable independently of transmit power control with an arbitrary amount of increase or decrease shown in Embodiments 1 to 3.

Furthermore, the present invention is also applicable to a system in which an FBI (Feed Back Information) bit is used for the purpose of reducing interference by transmit power control during handover.

As explained above, since the present invention indicates an increase or decrease and an amount of the increase or decrease of transmit power using the symbol and amplitude of a TPC bit, it is possible to improve the trackability during fast fading or in compressed mode and stability during slow fading without reducing data transmission efficiency.

This application is based on the Japanese Patent Application No.HEI 10-243743 filed on Aug. 28, 1998, the Japanese Patent Application No. HEI 11-065684 filed on Mar. 11, 1999 and the Japanese Patent Application No. HEI 11-178926 filed on Jun. 24, 1999, entire content of which is expressly incorporated by reference herein.

Industrial Applicability the present invention is applicable to a communication terminal apparatus such as a mobile station and base station apparatus in a digital radio communication system.

What is claimed is:

1. A transmission/reception apparatus comprising:

detecting means for detecting a received quality of a received signal;

reading means for reading a symbol and an amplitude of a TPC bit in the received signal;

control means for multiplexing the TPC bit with a transmission signal and setting an amplitude of said transmission signal for each bit; and transmitting means for transmitting said transmission signal with the amplitude set in said control means, wherein said control means comprises symbol setting means for setting the symbol of the TPC bit; TPC bit amplitude setting means for setting the amplitude of the TPC bit; and general amplitude setting means for setting the amplitude of a bit other than the TPC bit in the transmission signal, and wherein said symbol setting means sets the symbol using an output from said difference calculating means, and said TPC bit amplitude setting means sets the amplitude using an output from said ratio calculation means.

2. A transmission/reception apparatus comprising:

detecting means for detecting a received quality of a received signal;

reading means for reading a symbol and an amplitude of a TPC bit in the received signal;

control means for multiplexing the TPC bit with a transmission signal and setting an amplitude of said transmission signal for each bit; and transmitting means for transmitting said transmission signal with the amplitude set in said control means, wherein said general amplitude setting means obtains an increase or decrease amount from an output from said amplitude reading means, and sets, as the amplitude of a signal other than the TPC bit, a value obtained by adding or subtracting said increase or decrease amount to or from an amplitude at a previous transmission time based on an output from said symbol determining means, and said TPC bit amplitude setting means sets, as the amplitude of the TPC bit, a value obtained by multiplying the amplitude of the signal other than the TPC bit by an amount from said ratio determining means.

3. A transmission/reception apparatus comprising:

detecting means for detecting a received quality of a received signal;

reading means for reading a symbol and an amplitude of a TPC bit in the received signal;

control means for multiplexing the TPC bit with a transmission signal and setting an amplitude of said transmission signal for each bit; and transmitting means for transmitting said transmission signal with the amplitude set in said control means, wherein said detecting means comprises measuring means for measuring a SIR of the received signal; storage means for storing a reference SIR; difference calculating means for calculating a difference between a measured SIR and the reference SIR; and ratio calculating means for obtaining a ratio of the measured SIR and the reference SIR, wherein said ratio calculating means converts a calculated ratio into an increasing function to output, and wherein said ratio calculating means converts the calculated ratio into the increasing function by a calculation using a log and a square root.

4. A transmission/reception apparatus comprising:

recognizing means for recognizing a compressed mode for decreasing a spreading factor of a signal;

reading means for reading a symbol and an amplitude of a transmit power control signal in a received signal; and transmit power control means for performing transmit power control for the compressed mode at the time of the compressed mode, while performing transmit power control based on the symbol and the amplitude of said transmit power control signal at the time the compressed mode is cancelled.

5. The transmission/reception apparatus according to claim 4, wherein said transmit power control means comprises amplitude before pause interval control means for, at the time of the compressed mode, increasing a transmit power value in a predetermined period before a pause interval by a predetermined amount or predetermined ratio.

6. The transmission/reception apparatus according to claim 4, wherein said transmit power control means further comprises excess amplitude setting means for, at the time of the compressed mode, setting a target value in the transmit power control in a predetermined period after the pause interval at a value higher than a required transmit power value.

7. The transmission/reception apparatus according to claim 4, wherein said transmit power control means further comprises amplitude after pause interval setting means for, at the time of the compressed mode, setting a value obtained by adding an offset value to a transmit power value obtained immediately before the pause interval starts, as a transmit power value at the time transmission and reception restart after the pause interval, and offset setting means for predicting a transmit power value to be required immediately after the pause interval is finished, and setting a difference between a predicted value and the transmit power value obtained immediately before the pause interval starts as said offset value.

8. The transmission/reception apparatus according to claim 7, wherein said offset setting means determines the predicted value using the number of symbols of TPC bits obtained before the pause interval or an increase or decrease amount thereof as a reference.

9. The transmission/reception apparatus according to claim 4, further comprising:
chip interleaving means for subjecting spread transmission data to chip interleaving processing; and
chip deinterleaving means for subjecting received data to deinterleaving processing for each chip.

10. A transmit power control method comprising:
detecting step of detecting a received quality of a received signal;
reading step of reading a symbol and an amplitude of a TPC bit in the received signal;
control step of multiplexing the TPC bit with a transmission signal and setting an amplitude of said transmission signal for each bit; and
transmitting step of transmitting said transmission signal with the amplitude set in said control step,
wherein said control step comprises a symbol setting step of setting the symbol of the TPC bit in the transmission symbol; a TPC bit amplitude setting step of setting the amplitude of the TPC bit in the transmission signal; and a general amplitude setting step of setting the amplitude of a bit other than the TPC bit in the transmission signal, and
wherein said symbol setting step comprises the step of setting the symbol using an output in said difference calculating step, and said TPC bit amplitude setting step comprises the step of setting the amplitude using an output from said ratio calculation step.

11. A transmit power control method comprising:
detecting step of detecting a received quality of a received signal;
reading step of reading a symbol and an amplitude of a TPC bit in the received signal;
control step of multiplexing the TPC bit with a transmission signal and setting an amplitude of said transmission signal for each bit; and
transmitting step of transmitting said transmission signal with the amplitude set in said control step,
wherein said control step comprises a symbol setting step of setting the symbol of the TPC bit in the transmission symbol; a TPC bit amplitude setting step of setting the amplitude of the TPC bit in the transmission signal; and a general amplitude setting step of setting the amplitude of a bit other than the TPC bit in the transmission signal, and
wherein said general amplitude setting step comprises the steps of obtaining an increase or decrease amount from an output in said amplitude reading step; setting, as the amplitude of the signal other than the TPC bit, a value obtained by adding or subtracting said increase or decrease amount to or from an amplitude at a previous transmission time based on an output in said symbol determining step; and setting, as the amplitude of the TPC bit, a value obtained by multiplying the amplitude of the signal other than the TPC bit by an amount in said ratio determining step.

12. The transmit power control method comprising the steps of:
performing transmit power control for a compressed mode at the time of the compressed mode for decreasing a spreading factor of a signal; and
performing transmit power control based on a symbol and an amplitude of a transmit power control signal at the time the compressed mode is cancelled.

13. The transmit power control method according to claim 12, further comprising the step of, at the time of the compressed mode, increasing a transmit power value in a predetermined period before a pause interval by a predetermined amount or predetermined ratio.

14. The transmit power control method according to claim 12, further comprising the step of, at the time of the compressed mode, setting a target value in the transmit power control in a predetermined period after the pause interval at a value higher than a required transmit power value.

15. The transmit power control method according to claim 12, further comprising the step of:
predicting a transmit power value to be required immediately after the pause interval is finished, at the time of the compressed mode;
setting a difference between a predicted value and a transmit power value obtained immediately before the pause interval starts, as said offset value; and
setting a value obtained by adding said offset value to the transmit power value obtained immediately before the pause interval starts, as a transmit power value at the time transmission and reception restart after the pause interval.

16. The transmit power control method according to claim 15, further comprising the step of determining the predicted value using the number of symbols of TPC bits obtained before the pause interval or an increase or decrease amount thereof as a reference.

17. The transmit power control method according to claim 12, further comprising the steps of:
subjecting spread transmission data to chip interleaving processing; and
subjecting received data to deinterleaving processing for each chip.

18. A transmission/reception apparatus, comprising:
a detector that detects a received quality of a received signal;

a reader that reads a symbol of a transmit power control bit and a ratio of an amplitude of a signal other than the transmit power control bit to an amplitude of the transmit power control bit in the received signal;

a transmit power controller that determines whether to increase or decrease a transmit power based on said symbol and determines an amount of the increase or decrease based on said amplitude ratio;

a transmit power control bit generator that generates a generated transmit power control bit based on the received quality;

a controller that multiplexes the generated transmit power control bit on a transmission signal and sets an amplitude of said transmission signal on a per bit basis; and a transmitter that transmits said transmission signal with said amplitude set in said controller.

19. The transmission/reception apparatus according to claim 18, wherein said detector further comprises:

a measurer that measures an SIR of the received signal;

a storage that stores a reference SIR;

a difference calculator that calculates a difference of the measured SIR and the reference SIR; and a ratio calculator that calculates and obtains a ratio of the measured SIR and the reference SIR.

20. The transmission/reception apparatus according to claim wherein said controller further comprises:

a symbol setter that sets the symbol of the generated transmit power control bit;

a transmit power control bit amplitude setter that sets the amplitude of the generated transmit power control bit; and a general amplitude setter that sets the amplitude of other bits than the generated transmit power control bit in the transmission signal.

21. The transmission/reception apparatus according to claim 20, wherein:

said symbol setter sets the symbol based on a difference of an SIR of the received signal and a reference SIR; and said transmit power control bit amplitude setter sets the amplitude of the generated transmit power control bit based on a ratio of the SIR of the received signal and the reference SIR.

22. The transmission/reception-apparatus according to claim 18, wherein said reader further comprises:

a symbol determiner that reads the symbol of the received transmit power control bit; and an amplitude reader that reads the ratio of the amplitude of the received transmit power control bit and the amplitude of the signal other than said received transmit power control bit.

23. The transmission/reception apparatus according to claim 20, wherein:

said general amplitude setter obtains an amount of increase or decrease based on the ratio of the amplitude of the received transmit power control bit and the amplitude of the signal other than said received transmit power control bit and sets the amplitude of the signal other than the generated transmit power control bit with a value obtained by adding or subtracting said amount of the increase or decrease to or from an amplitude at a previous transmission time based on a prior received transmit power control bit; and said transmit power control bit amplitude setter sets the amplitude of the generated transmit power control bit with a value obtained by multiplying the amplitude of the signal other than the generated transmit power control bit by a ratio of the SIR of the received signal and a reference SIR.

24. The transmission/reception apparatus according to claim 20, further comprising a limiter that sets a limit on an output from said transmit power control bit amplitude setter.

25. The transmission/reception apparatus according to claim 19, further comprising a limiter that sets a limit on an output from said ratio calculator.

26. The transmission/reception apparatus according to claim 20, further comprising a limiter that sets a limit on an output from said general amplitude setter.

27. The transmission/reception apparatus according to claim 22, further comprising a limiter that sets a limit on an output from said amplitude reader.

28. The transmission/reception apparatus according to claim 19, wherein said ratio calculator converts the obtained ratio into an increasing function and outputs said increasing function.

29. The transmission/reception apparatus according to claim 28, wherein said ratio calculator converts the obtained ratio into the increasing function through a calculation using a log function and a square root function.

30. A transmission/reception apparatus, comprising:

a recognizer that recognizes a compressed mode in which a spreading factor of a signal is reduced;

a reader that reads a symbol of a transmit power control bit and a ratio of an amplitude of a signal other than the transmit power control bit to an amplitude of the transmit power control bit in a received signal; and a transmit power controller that performs, at the time of the compressed mode, a transmit power control for the compressed mode, and that determines, when the compressed mode is cancelled, to increase or decrease a transmit power value based on the symbol and determines an amount of the increase or decrease based on the amplitude ratio.

31. The transmission/reception apparatus according to claim 30, wherein said transmit power controller further comprises an amplitude before pause interval controller that at the time of the compressed mode, increases a transmit power value of a predetermined period before a pause interval by a predetermined amount or a predetermined ratio.

32. The transmission/reception apparatus according to claim 30, wherein said transmit power controller further comprises an excess amplitude setter that, at the time of the compressed mode, sets a target value in the transmit power control of a predetermined period after a pause interval, said target value set higher than a required transmit power value.

33. The transmission/reception apparatus according to claim 30, wherein said transmit power controller further comprises:

an amplitude after pause interval setter that, at the time of the compressed mode, adds an offset value to the transmit power value obtained immediately before a pause interval and sets a transmit power value for a time that transmission and reception resume after the pause interval; and an offset setter that predicts the transmit power value that will be required immediately after the pause interval and sets the offset value with a difference of a prediction value and the transmit power value immediately before the pause interval.

34. The transmission/reception apparatus according to claim 33, wherein said offset setter determines the prediction value based on a reference, said reference being a number of symbols of the received transmit power control bit received before the pause interval or the amount of the increase or decrease.

35. The transmission/reception apparatus according to claim 30, further comprising:
a chip interleaver that performs a chip interleaving processing to spread transmission data; and
a chip deinterleaver that performs a deinterleaving processing to received data on a per chip basis.

36. A communication terminal apparatus comprising a transmission/reception apparatus, the communication terminal apparatus comprising:
a detector that detects a received quality of a received signal;
a reader that reads a symbol of a transmit power control bit and a ratio of an amplitude of a signal other than the transmit power control bit to an amplitude of the transmit power control bit in the received signal;
a transmit power controller that determines whether to increase or decrease a transmit power based on said symbol and determines an amount of the increase or decrease based on said amplitude ratio;
a transmit power control bit generator that generates a generated transmit power control bit based on said received quality;
a controller that multiplexes the generated transmit power control bit on a transmission signal and sets an amplitude of said transmission signal on a per bit basis; and
a transmitter that transmits said transmission signal with the amplitude set in said controller.

37. A base station apparatus comprising a transmission/reception apparatus, said base station apparatus comprising:
a detector that detects a received quality of a received signal;
a reader that reads a symbol of a transmit power control bit and a ratio of an amplitude of a signal other than the transmit power control bit to an amplitude of the transmit power control bit in the received signal;
a transmit power controller that determines whether to increase or decrease a transmit power based on said symbol and determines an amount of the increase or decrease based on said amplitude ratio;
a transmit power control bit generator that generates a generated transmit power control bit based on the received quality;
a controller that multiplexes the generated transmit power control bit on a transmission signal and sets an amplitude of said transmission signal on a per bit basis; and
a transmitter that transmits said transmission signal with the amplitude set in said controller.

38. A transmit power control method, comprising:
detecting a received quality of a received signal;
reading a symbol of a transmit power control bit and a ratio of an amplitude of a signal other than the transmit power control bit to an amplitude of the transmit power control bit in the received signal;
performing a transmit power control for determining whether to increase or decrease a transmit power based on said symbol and determines an amount of the increase or decrease based on said amplitude ratio;
generating a generated transmit power control bit based on the received quality;
performing a control for multiplexing the generated transmit power control bit on a transmission signal and setting an amplitude of said transmission signal on a per bit basis; and transmitting said transmission signal with the amplitude in said control step.

39. The transmit power control method according to claim 38, wherein the detection further comprises:
measuring an SIR of the received signal to calculate and obtain a difference of the measured SIR and a pre-stored reference SIR; and
obtaining a ratio of the measured SIR and the reference SIR.

40. The transmit power control method according to claim 38, wherein said control step further comprises:
setting a symbol of the generated transmit power control bit in the transmission signal;
setting an amplitude of said generated transmit power control bit in said transmission signal; and
setting an amplitude of other bits than said generated transmit power control bit in said transmission signal.

41. The transmit power control method according to claim 40, wherein:
the symbol of said generated transmit power control bit is set based on a difference of an SIR of the received signal and a reference SIR; and
the amplitude of the generated transmit power control bit is set based on a ratio of the SIR of the received signal and the reference SIR.

42. The transmit power control method according to claim 40, further comprising setting an amplitude of other bits than the generated transmit power control bit in the transmission signal by:
obtaining the amount of the increase or decrease base on the ratio of the amplitude of the received transmit power control bit and the amplitude of the signal other than the received transmit power control bit;
setting the amplitude of the signal other than the generated transmit power control bit by adding or subtracting said amount of the increase or decrease to or from an amplitude at a previous transmission time base on a prior received transmit power control bit; and
setting the amplitude of the generated transmit power control bit with a value obtained by multiplying the amplitude of the signal other than the generated transmit power control bit by a ratio of an SIR of the received signal and a reference SIR.

43. A transmit power control method, comprising:
performing, at a time of a compressed mode in which a spreading factor of a signal is reduced, a transmit power control for the compressed mode; and
determining, when the compressed mode is cancelled, to increase or decrease a transmit power based on a symbol of a received transmit power control bit, and determining an amount of the increase or decrease based on an amplitude of the received transmit power control bit.

44. The transmit power control method according to claim 43, further comprising, at the time of the compressed mode, increasing a transmit power value of a predetermined period before a pause interval by a predetermined amount or a predetermined ratio.

45. The transmit power control method according to claim 43, further comprising, at the time of the compressed mode, setting a target value in the transmit power control of a predetermined period after a pause interval, said target value set higher than a required transmit power value.

46. The transmit power control method according to claim 43, further comprising:

predicting, at the time of the compressed mode a transmit power value that will be required immediately after a pause interval;

setting an offset value with a difference of the predicted transmit power value and a transmit power value immediately before the pause interval; and setting a transmit power value for the time that transmission and reception resume after the pause interval with a value obtained by adding the offset value to the transmit power value obtained immediately before the pause interval.

47. The transmit power control method according to claim 46, further comprising determining the prediction value based on a reference, said reference being a number of received transmit power control bit symbols received before the pause interval or being the amount of the increase or decrease.

48. The transmit power control method according to claim 43, further comprising:

performing a chip interleaving processing to spread transmission data; and performing a deinterleaving processing to received data on a per chip basis.

* * * * *